United States Patent
Howard et al.

(10) Patent No.: US 8,769,469 B1
(45) Date of Patent: Jul. 1, 2014

(54) SYSTEM AND METHOD OF CROSSOVER DETERMINATION IN DIFFERENTIAL PAIR AND BONDWIRE PAIRS TO MINIMIZE CROSSTALK

(71) Applicants: Gregory Eric Howard, Plano, TX (US); Andy Quang Tran, Grand Prairie, TX (US); Yanli Fan, Allen, TX (US); Kartheinz Muth, Richardson, TX (US)

(72) Inventors: Gregory Eric Howard, Plano, TX (US); Andy Quang Tran, Grand Prairie, TX (US); Yanli Fan, Allen, TX (US); Kartheinz Muth, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/728,196

(22) Filed: Dec. 27, 2012

(51) Int. Cl.
  *G06F 17/50* (2006.01)
(52) U.S. Cl.
  USPC .......................................................... 716/132
(58) Field of Classification Search
  USPC ................................................ 716/100, 132
  See application file for complete search history.

(56) References Cited

U.S. PATENT DOCUMENTS

| | | | |
|---|---|---|---|
| 5,903,461 A * | 5/1999 | Rostoker et al. | 700/121 |
| 7,736,195 B1 * | 6/2010 | Poulsen et al. | 439/676 |
| 8,024,693 B2 * | 9/2011 | Adams et al. | 716/132 |
| 2008/0308294 A1 * | 12/2008 | Nair | 174/113 R |
| 2009/0189059 A1 * | 7/2009 | Smith | 250/214 LA |
| 2010/0115476 A1 * | 5/2010 | Adams et al. | 716/2 |

* cited by examiner

*Primary Examiner* — Suchin Parihar
(74) *Attorney, Agent, or Firm* — Steven A. Shaw; Wade James Brady, III; Frederick J. Telecky, Jr.

(57) ABSTRACT

A system is provided for use with circuit layout design data having a set of differential pairs and a set of bond wire pairs. A layout portion can receive the circuit layout design data. A crosstalk calculating portion can determine a first amount of crosstalk in a circuit corresponding to the circuit layout design data. A modifier can modify the circuit layout design data into modified circuit layout design data such that one of the set of differential pairs and the set of bond wire pairs includes a crossover. The crosstalk calculating portion can further determine a second amount of crosstalk in a circuit corresponding to the modified circuit layout design data. An optimizer can compare the first amount of crosstalk with the second amount of crosstalk to generate optimized circuit layout design data. A layout designer can output the optimized circuit layout design data.

14 Claims, 17 Drawing Sheets

| X12 D | K12D | COUPLING [dB] |
|---|---|---|
| 2.87 | 0.1150 | -18.79 |

| | [MICRONS] | | | | [MICRONS] | | |
|---|---|---|---|---|---|---|---|
| NODE | x | y | z | NODE | x | y | z |
| N1_1 | -105 | 0 | 175 | N3_1 | 105 | 0 | 175 |
| N1_2 | -105 | 0 | 225 | N3_2 | 105 | 0 | 225 |
| N1_3 | -50 | 700 | 225 | N3_3 | 50 | 700 | 225 |
| N1_4 | -50 | 700 | 0 | N3_4 | 50 | 700 | 0 |
| N2_1 | -35 | 0 | 175 | N4_1 | 35 | 0 | 175 |
| N2_2 | -35 | 0 | 295 | N4_2 | 35 | 0 | 295 |
| N2_3 | -150 | 600 | 295 | N4_3 | 150 | 600 | 295 |
| N2_4 | -150 | 600 | 0 | N4_4 | 150 | 600 | 0 |

| X12 D | K12 D | COUPLING [dB] |
|---|---|---|
| 3.30 | 0.1329 | -17.53 |

| | [MICRONS] | | | | [MICRONS] | | |
|---|---|---|---|---|---|---|---|
| NODE | x | y | z | NODE | x | y | z |
| N1_1 | -105 | 0 | 175 | N3_1 | 105 | 0 | 175 |
| N1_2 | -105 | 0 | 225 | N3_2 | 105 | 0 | 225 |
| N1_3 | -50 | 700 | 175 | N3_3 | 50 | 700 | 175 |
| N1_4 | -50 | 700 | 0 | N3_4 | 50 | 700 | 0 |
| N2_1 | -35 | 0 | 175 | N4_1 | 35 | 0 | 175 |
| N2_2 | -35 | 0 | 295 | N4_2 | 35 | 0 | 295 |
| N2_3 | -150 | 600 | 295 | N4_3 | 150 | 600 | 295 |
| N2_4 | -150 | 600 | 0 | N4_4 | 150 | 600 | 0 |

| X12 D | K12D | COUPLING [dB] |
|---|---|---|
| 1.41 | 0.0503 | 24.54 |

| | [MICRONS] | | | | [MICRONS] | | |
|---|---|---|---|---|---|---|---|
| NODE | x | y | z | NODE | x | y | z |
| N1_1 | -120 | 0 | 175 | N3_1 | 120 | 0 | 175 |
| N1_2 | -120 | 0 | 225 | N3_2 | 120 | 0 | 225 |
| N1_3 | -100 | 700 | 175 | N3_3 | 100 | 700 | 225 |
| N1_4 | -100 | 700 | 0 | N3_4 | 100 | 700 | 0 |
| N2_1 | -50 | 0 | 175 | N4_1 | 50 | 0 | 175 |
| N2_2 | -50 | 0 | 295 | N4_2 | 50 | 0 | 295 |
| N2_3 | -150 | 600 | 295 | N4_3 | 150 | 600 | 295 |
| N2_4 | -150 | 600 | 0 | N4_4 | 150 | 600 | 0 |

| X12 D | K12D | COUPLING [dB] |
|---|---|---|
| 1.18 | 0.0475 | -26.47 |

| | [MICRONS] | | | | [MICRONS] | | |
|---|---|---|---|---|---|---|---|
| NODE | x | y | z | NODE | x | y | z |
| N1_1 | -120 | 0 | 175 | N3_1 | 120 | 0 | 175 |
| N1_2 | -120 | 0 | 225 | N3_2 | 120 | 0 | 225 |
| N1_3 | -100 | 700 | 175 | N3_3 | 100 | 700 | 225 |
| N1_4 | -100 | 700 | 0 | N3_4 | 100 | 700 | 0 |
| N2_1 | -50 | 0 | 175 | N4_1 | 50 | 0 | 175 |
| N2_2 | -50 | 0 | 295 | N4_2 | 50 | 0 | 295 |
| N2_3 | -200 | 600 | 295 | N4_3 | 200 | 600 | 295 |
| N2_4 | -200 | 600 | 0 | N4_4 | 200 | 600 | 0 |

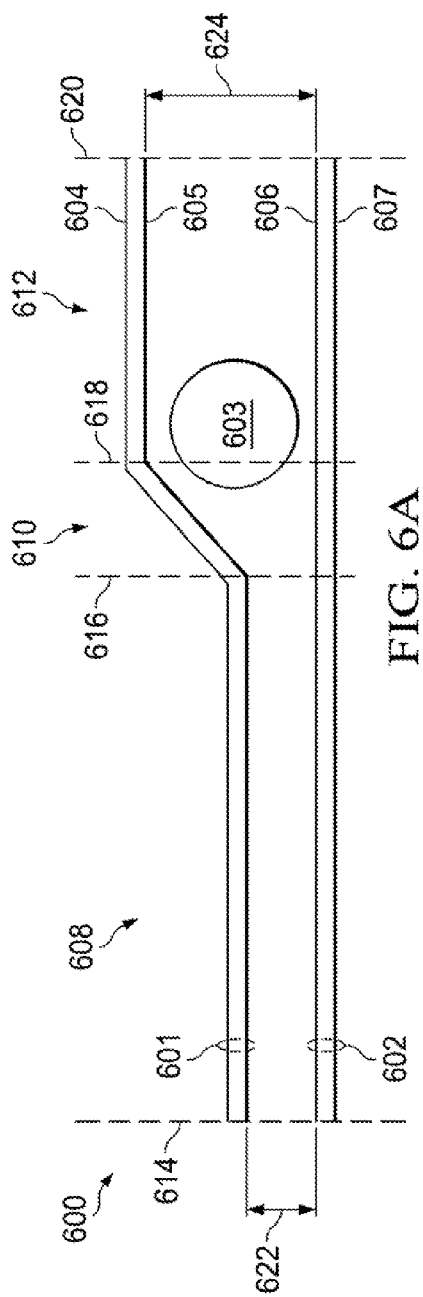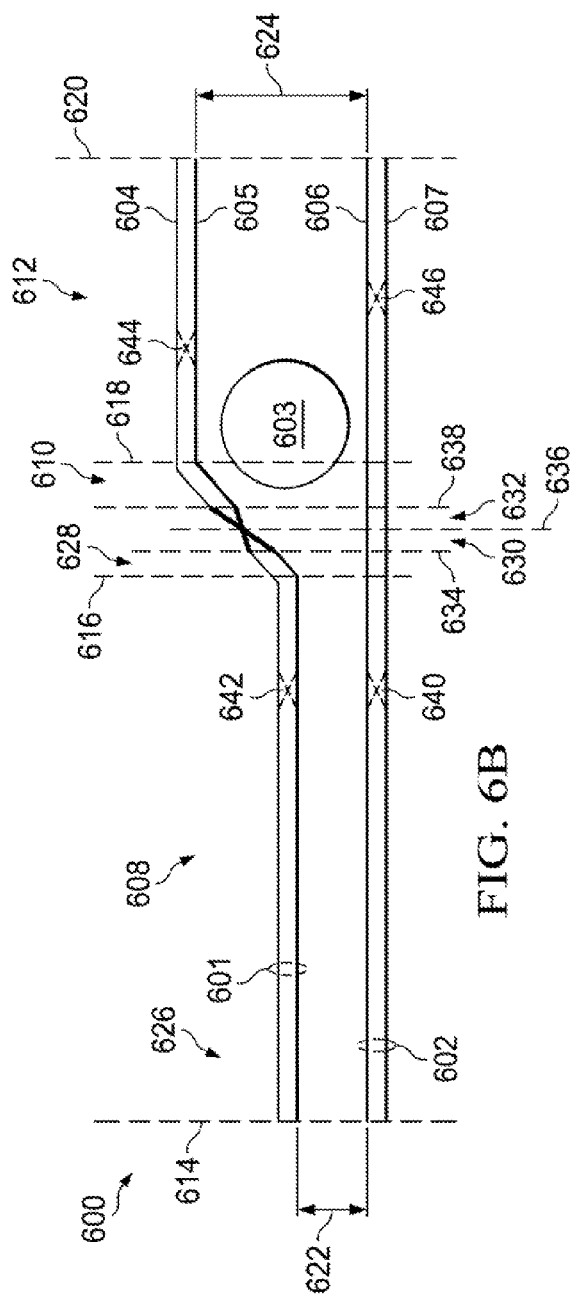

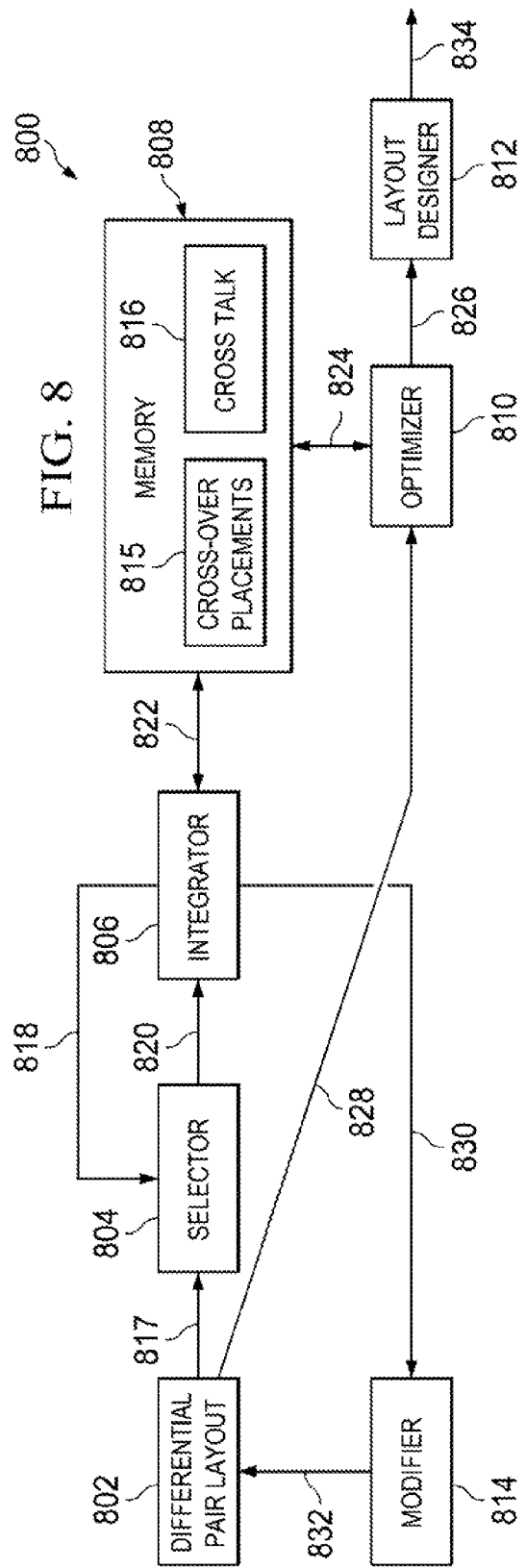

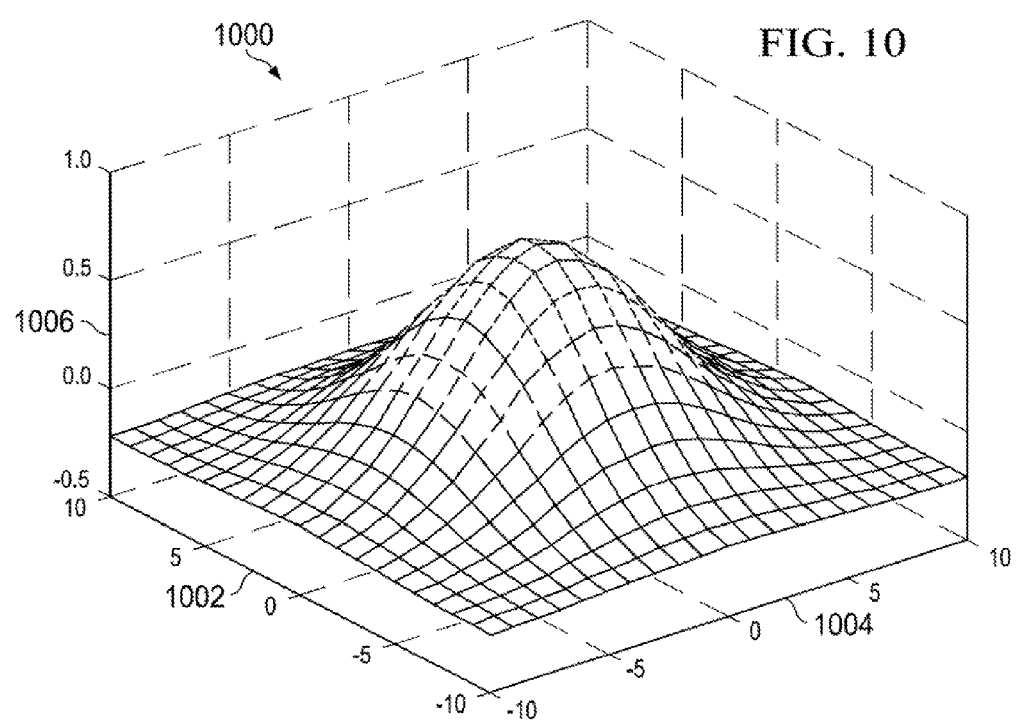

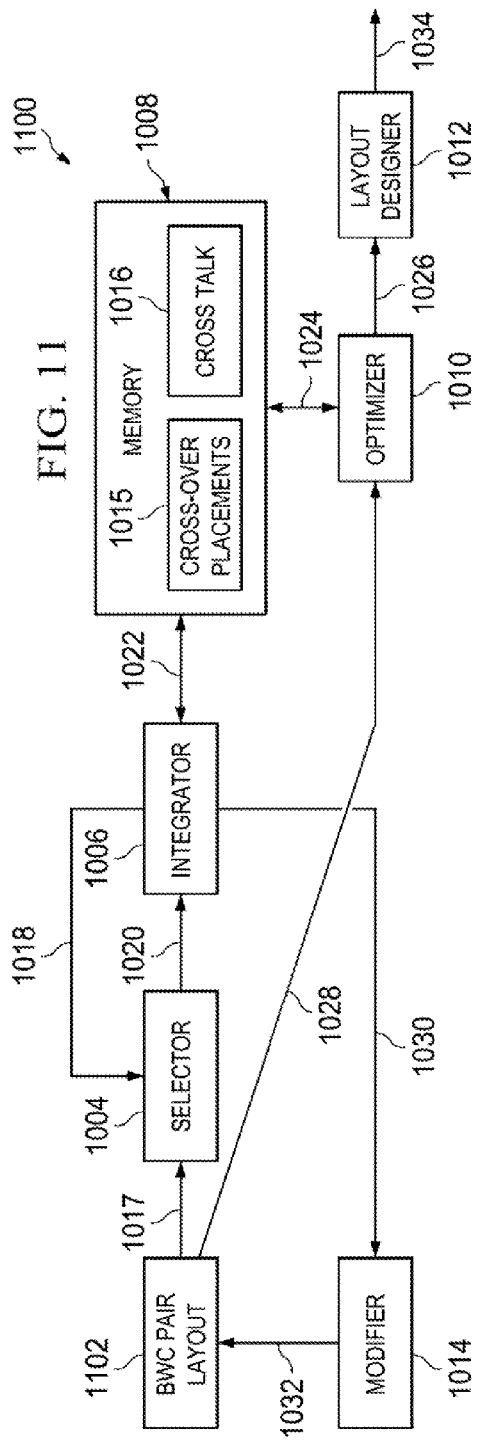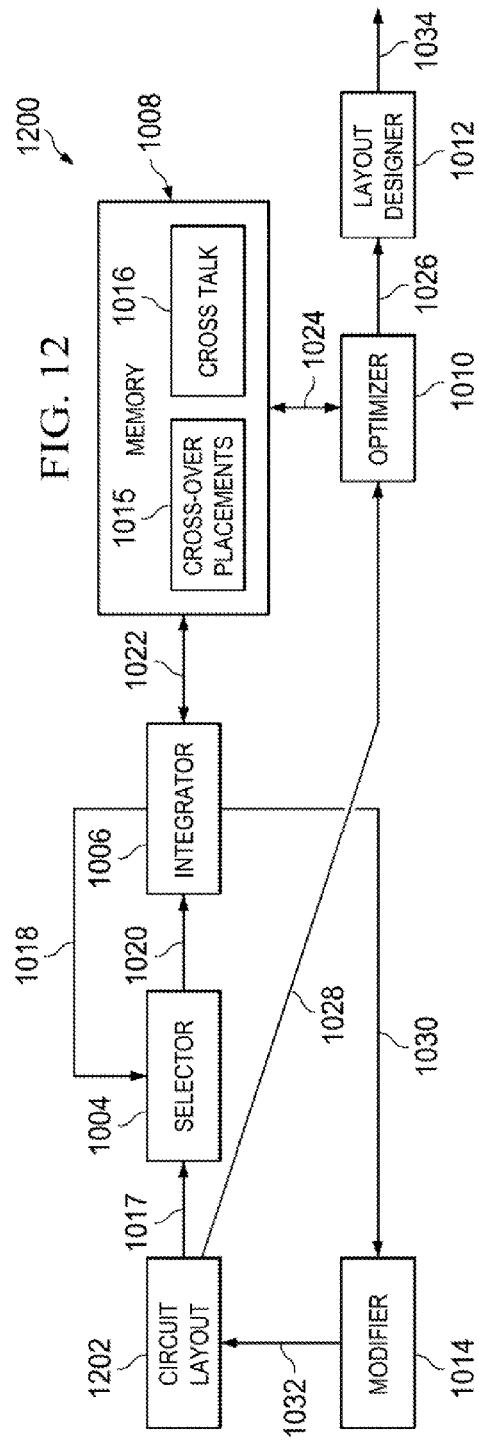

SYSTEM AND METHOD OF CROSSOVER DETERMINATION IN DIFFERENTIAL PAIR AND BONDWIRE PAIRS TO MINIMIZE CROSSTALK

BACKGROUND

The operating speeds of semiconductor devices have continued to increase and continuously push the limit of conventional packaging technology.

To support the ever increasing operation speed of semiconductor devices, a differential pair is often used. A differential pair is a pair of conductors used for differential signaling. A differential pair reduces crosstalk and electromagnetic interference and can provide constant and/or known characteristic impedance. Furthermore, a differential pair enables impedance matching techniques used for high-speed signal transmission lines. Non-limiting examples of a differential pair include twisted-pair, microstrip and stripline.

A differential pair reduces the total current between the two conductors of the differential pair, as Kirchhoffs Law predicts the total current as being zero through a cross section of the differential pair. The condition for emitting zero electromagnetic interference representing zero crosstalk is for zero total current through the cross section of the differential pair. However, in real world situations, zero current is not achieved, resulting in crosstalk between the conductors of a differential pair.

Additionally, crosstalk may occur between differential pairs as a result of second-order effects due to the finite impedance of the current source and impedance mismatch between the devices. For this case, the two conductors of the differential pair may be considered as a dipole with coupling on the order of $1/r^2$ or $1/r^4$, where r is the distance between lines of differential pairs. To reduce crosstalk, the effects associated with second-order effects need to be reduced.

The differential to differential pair crosstalk in electronic equipment limits its applicability to higher than 5 GHz types of Serializer/Deserializer (Serdes) designs. The crosstalk between differential pairs needs to be kept to a level of around −60 dB or less in order to minimize its impact on the channels ability to receive a greatly attenuated signal.

Modem signal channels at high speed can introduce an attenuation of 40 dB or more. To properly receive such a signal in the presence of a fully duplexed communication stream, a cross-coupling immunity of 60 dB is needed for reliable signal reception.

The crosstalk between differential pairs can be calculated.

In order to determine the crosstalk between differential pairs, the mutual inductance is calculated. The mutual inductance by a filamentary circuit i on another filamentary (consisting of wires and rods) circuit is given by the double integral Neumann formula as give by Equation 1 below:

$$M_{ij} = \frac{\mu_0}{4\pi} \oint_{C_i} \oint_{C_j} \frac{ds_i \cdot ds_j}{|R_{ij}|} \quad (1)$$

Where $\mu_0$ denotes the magnetic constant ($4\pi \times 10^{-7}$ H/m), $C_i$ and $C_j$ are the curves spanned by the wires, $R_{ij}$ is the distance between two points.

The currents associated with the positive and negative conductors of a differential have the same magnitude of current but traversing in opposing directions.

Differential pair to differential pair crosstalk is a technology limiter that causes system failure in the form of signal detection error—increasing the system jitter and causing the signal detection eye pattern to close. An eye pattern, also known as an eye diagram, is a presentation (e.g. oscilloscope display) of a digital data signal as received at a receiver. Furthermore, the received signal is repetitively sampled and applied to the vertical input, while the data rate is used to trigger the horizontal sweep.

Reduction of this crosstalk is possible using a technique known as orthogonal crossovers. The use of crossovers between differential pairs introduces significant discontinuities in the transmission lines that make up the differential pairs. A significant source of the discontinuities are a result of the vias that are used to move the pair from one side to the other. A via in an integrated circuit or printed circuit board is a mechanism for transferring a signal from one signal layer to another signal layer.

Alternate methods used to reduce the reflections from the crossovers include designing the via structure in such a way as to match the characteristic impedance of the line.

FIGS. 1A-C illustrates an example conventional transmission line system 100.

Transmission line system 100 includes a differential pair 102 and a differential pair 104.

Non-limiting examples of a differential pair include twisted-pair, microstrip and stripline. Differential pairs 102 and 104 provide a transmission medium for transferring an electrical signal. A differential pair reduces crosstalk and electromagnetic interference and can provide constant and/or known characteristic impedance. Furthermore, a differential pair enables impedance matching techniques used for high-speed signal transmission lines.

Differential pair 102 includes a positive signal trace 106 and a negative signal trace 108. Differential pair 104 includes a positive signal trace 110 and a negative signal trace 112. In some embodiments, the positive signal associated with positive signal trace 106 is equal and opposite to the negative signal associated with negative signal trace 108. In other embodiments, the positive signal associated with positive signal trace 106 is different in magnitude to the negative signal associated with negative signal trace 108. In theory, for embodiments with equal but opposite signals associated with positive signal trace 106 and negative signal trace 108, the radiant electromagnetic field generated by the positive signal in positive signal trace 106 is cancelled by the equal and opposite radiant electromagnetic field generated by the negative signal in negative signal trace 108. Similarly, for some embodiments, the positive signal in positive signal trace 110 is equal and opposite to the negative signal in negative signal trace 112. In theory, radiant electromagnetic field generated by the positive signal in positive signal trace 110 is cancelled by the equal and opposite radiant electromagnetic field generated by the negative signal in negative signal trace 112.

The radiant effects of current through a differential pair may negatively affect the signals in an adjacent (or nearby) differential pair. In particular, a current traveling through one signal trace (or path) may affect the current traveling through another signal trace, wherein the magnitude is a function of distance. For example, current traveling through positive signal trace 106 will affect current traveling through positive signal trace 110, and will also affect current traveling through negative signal trace 112, but by a slightly less amount. Further, current traveling through negative signal trace 108 will affect current traveling through positive signal trace 110, and will also affect current traveling through negative signal trace 112, but by a slightly less amount. The overall effect is known as crosstalk interference, or crosstalk.

The total effects of crosstalk may be determined by integrating the effect along a length of the crosstalk, in this instance a length 114 noted as L. To simplify the discussion, first consider the effects of positive signal trace 106 and negative signal trace 108 on positive signal trace 110. Then, consider the effects of positive signal trace 106 and negative signal trace 108 on negative signal trace 112. This will be further described with reference to FIGS. 1B-C.

FIG. 1B takes into account the effects of currents of positive signal trace 106 and negative signal trace 108, as felt by positive signal trace 110. In this example, negative signal trace 108 and is separated from positive signal trace 110 by a distance 116 noted as $r_1$, whereas positive signal trace 106 and is separated from positive signal trace 110 by a distance 118 noted as $r_2$. The radiant effects of currents of positive signal trace 106, as felt by positive signal trace 110, are opposite to the radiant effects of currents of negative signal trace 108, as felt by positive signal trace 110. However, distance 116 is smaller than distance 118. Accordingly, the radiant effects of currents of negative signal trace 108, as felt by positive signal trace 110 are greater than the radiant effects of currents of positive signal trace 106.

FIG. 1C takes into account the effects of currents of positive signal trace 106 and negative signal trace 108, as felt by negative signal trace 112. In this example, negative signal trace 108 and is separated from negative signal trace 112 by distance 118 (again noted as $r_2$), whereas positive signal trace 106 and is separated from negative signal trace 112 by a distance 120 noted as $r_3$. The radiant effects of currents of positive signal trace 106, as felt by negative signal trace 112, are opposite to the radiant effects of currents of negative signal trace 108, as felt by negative signal trace 112. However, distance 118 is smaller than distance 120. Accordingly, the radiant effects of currents of negative signal trace 108, as felt by negative signal trace 112 are greater than the radiant effects of currents of positive signal trace 106 as felt by negative signal trace 112.

Comparing the situations illustrated in FIGS. 1B-C, it is clear that the radiant effects of currents of positive signal trace 106 as felt by positive signal trace 110 (as shown in FIG. 1B) is equal and opposite to the radiant effects of currents of negative signal trace 108 as felt by negative signal trace 112 (as shown in FIG. 1C). Accordingly, the radiant effects effectively cancel.

The remaining radiant effects are therefore drawn to the radiant effect of current of negative signal trace 108 as felt by positive signal trace 110 (as shown in FIG. 1B) in addition to the radiant effect of current of positive signal trace 106 as felt by negative signal trace 112 (as shown in FIG. 1C). Ideally, the current in positive signal trace 110 should be equal and opposite to the current in negative signal trace 112. However, radiant effect of current of negative signal trace 108 alter the current in positive signal trace 110, whereas the radiant effect of current of positive signal trace 106 will alter the negative signal trace 112. For simplicity of explanation, let the "alteration" the current in positive signal trace 110 be an attenuation, and let of the "alteration" the current in positive signal trace 110 additionally be an attenuation. The attenuation of the signal in negative signal trace 112 is less than the attenuation of the signal in positive signal trace 110 because $r_2 < r_3$. The difference in interference creates a distortion in the signal if positive signal trace 110 and negative signal trace 112 are attenuated differently. Even though the interference may be minor, the interference calculation is integrated over the length of distance 114 or L as described by Equation 1.

In order to reduce crosstalk, conventional systems cross or switch conductors of a differential pair in order to balance the coupling between the differential pairs which will be further discussed with reference to FIG. 2.

FIG. 2 illustrates an example conventional transmission line system 200, wherein one set of signal traces include a crossover.

As shown in the figure, prior to a crossover point 206, positive signal trace 110 is separated from negative signal trace 108 by distance 116 (indicated by $r_1$), whereas negative signal trace 112 is separated from positive signal trace 106 by distance 120 (indicated by $r_3$). After crossover point 206, negative signal trace 112 is separated from negative signal trace 108 by distance 116 (indicated by $r_1$), whereas positive signal trace 110 is separated from positive signal trace 106 by distance 120 (indicated by $r_3$). For purposes of discussion, let crossover point 206 be in the middle of distance L.

The radiant effects of the current of negative signal trace 108 as felt by positive signal trace 110 from the left of the figure to crossover point 206 is equal in magnitude and opposite in sign to the radiant effects of the current of negative signal trace 108 as felt by negative signal trace 112 crossover point 206 to the right of the figure. Accordingly, the radiant effects of the current from the left side of the figure to the right side of the figure cancel each other out. Similarly, the radiant effects of the current of positive signal trace 106 as felt by negative signal trace 112 from the left of the figure to crossover point 206 is equal in magnitude and opposite in sign to the radiant effects of current of positive signal trace 106 as felt by positive signal trace 110 crossover point 206 to the right of the figure. Accordingly, the radiant effects of the current from the left side of the figure to the right side of the figure cancel each other out. Canceling the radiant effects is the purpose or goal of performing the crossover in differential pairs. Conventionally, crossovers are formed by "tunneling" below one of the signal traces.

Similar to performing crossovers with differential pairs, crossovers may be performed with bond wires as discussed with respect to FIGS. 3A-5D.

Crosstalk interference may additionally originate from other portions of a semiconductor device, namely bond wires.

A common semiconductor component encapsulates a semiconductor device in a package and uses bond wires to form a connection between the bond pads associated with the semiconductor device and the bond pads associated with the package. Bond wires may be adhered or welded to bond pads using some combination of heat, pressure and ultrasonic energy.

In a wirebond design the bond wire pair to bond wire pair coupling ranges from −17 dB to −38 dB for a range of spacing from 1(K) microns to 550 microns between the pairs. For a multi-channel Serdes link, the pairs need to be spaced at 600 microns or closer to get a reasonable number of channels into a given design. This is generally the case for wirebond designs, as wirebond designs are typically limited to 25 high speed input/output signal connections.

The standard solution for reducing bond wire to bond wire coupling is to space the pairs further and further apart. However, today's modem semiconductor die designs with large numbers of high speed input/output signals do not provide enough space to support −60 dB coupling.

Aspects of the conventional technology for bond wires associated with semiconductor packaging will now be described in greater detail with reference to FIGS. 3A-5D.

FIG. 3A illustrates a conventional bond wire configuration associated with a semiconductor device and a package.

A bond wire configuration 300 includes a semiconductor device 302, a package 304, a differential pair 305 and a differential pair 306. Differential pair 305 includes a bond wire 307 and a bond wire 308. Differential pair 306 includes a bond wire 310 and a bond wire 312. Semiconductor device 302 includes a bond pad 314, a bond pad 316, a bond pad 318 and a bond pad 320. Package 304 includes a bond pad 322, a bond pad 324, a bond pad 326 and a bond pad 328.

A signal (or power) line (not shown) on bond pad 314 connects to a corresponding signal (or power) line (not shown) on bond pad 322 via bond wire 307. A signal (or power) line (not shown) on bond pad 316 connects to a signal (or power) line (not shown) on bond pad 324 via bond wire 308. A signal (or power) line (not shown) on bond pad 318 connects to a signal (or power) line (not shown) on bond pad 326 via bond wire 310. A signal (or power) line (not shown) on bond pad 320 connects to a signal (or power) line (not shown) on bond pad 328 via bond wire 312.

Semiconductor device 302 provides electrical circuitry for electrical operations. Non-limiting examples for semiconductor device 302 include microprocessor and memory. Package 304 provides carriage and protection for semiconductor device 302. Differential pair 305 provides a transmission medium for transferring an electrical signal. Differential pair 306 provides a transmission medium for transferring an electrical signal. Bond pad 314. 316, 318 and 320 provide electrical connection to circuitry associated with semiconductor device 302. Bond pad 322, 324, 326 and bond pad 328 provide electrical connection to leads associated with package 304. As a non-limiting example, leads may be surface mount capable.

In operation, electrical signals traverse from semiconductor device 302 to bond pads 314, 316, 318, and 320. Furthermore, electrical signals traverse from bond pads 314, 316, 318 and 320 to bond pad 322, 324, 326, and 328 via bond wire 307, 308, 310 and 312, respectively. Furthermore, electrical signals traverse from bond pad 322, 324, 326 and 328 to electrical leads. Furthermore, electrical signals traverse from electrical leads to other electrical and electronic devices located external to package 304. Furthermore, crosstalk may occur between the bond wires and cause signaling errors. Crosstalk is a phenomenon by which a signal transmitted on one circuit or channel creates an unwanted effect in another circuit or channel. Crosstalk is typically caused by unwanted capacitive, inductive or conductive coupling from one circuit, part of a circuit or channel, to another. In general, the closer in distance channels are collocated, the greater the chance of experiencing crosstalk and conversely, the further the channels are collocated, the smaller the chance of experiencing crosstalk.

As an example, the separation between bond wire 307 and bond wire 308 and between bond wire 310 and bond wire 312 at semiconductor device 302 is configured for 70 microns. Furthermore, the separation between bond wire 307 and bond wire 308 and between bond wire 310 and bond wire 312 at package 304 is 100) microns. Furthermore, the distance between bond wire 307 and bond wire 312 at semiconductor device 302 is configured for 400 microns. Furthermore, the distance between bond wire 307 and bond wire 312 at package 304 is 400 microns. Furthermore, the distance between bond wire 308 and bond wire 310 at semiconductor device 302 is 70 microns.

In order to reduce issues associated with crosstalk, the separation between bond wires may be increased as will be discussed with reference to FIG. 3B.

FIG. 3B illustrates a conventional bond wire configuration associated with a semiconductor device and a package where bond wire separation is increased over the separation depicted in FIG. 3A.

As shown in FIG. 3B (and similar to the situation of FIG. 3A), the separation between bond wire 307 and bond wire 308 at semiconductor device 302 remains 70 microns and the separation between bond wire 307 and 308 at package 304 remains 100 microns.

However, as shown in FIG. 3B, the separation between bond wire 307 and bond wire 312 at semiconductor device 302 is 310 microns. This is a 90 micron decrease (22.5%) in distance of the similar separation of FIG. 3A. As shown in FIG. 3B (similar to the situation of FIG. 3A), the separation between bond wire 307 and bond wire 312 at package 304 is 400 microns. The separation between bond wire 308 and bond wire 310 at semiconductor device 302 is 170 microns. This is a 100 micron increase (142%) in distance of the similar separation of FIG. 3A. As shown in FIG. 3B, the separation between bond wire 308 and bond wire 310 at package 304 is 200 microns. This is a 100 micron (100%) increase in distance of the similar separation of FIG. 3A.

The increased separation of bond wires, as shown in FIG. 3B, provided less signal interference. As an example, the noise margin for the configuration as illustrated in FIG. 3B may experience a 10 dB improvement over FIG. 3A, as crosstalk is reduced due to the increased distance between bond wire 308 and bond wire 310.

FIG. 3C illustrates a conventional bond wire configuration associated with a semiconductor device and a package where bond wire separation is further increased over the separation depicted in FIG. 3B.

As shown in FIG. 3C (and similar to the situation of FIGS. 3A-B), the separation between bond wire 307 and bond wire 308 at semiconductor device 302 remains 70 microns and the separation between bond wire 307 and 308 at package 304 remains 100 microns.

As further shown in FIG. 3C, the separation between bond wire 307 and bond wire 312 at semiconductor device 302 is 410 microns. This is a 10 micron increase (2.5%) in distance of the similar separation of FIG. 3A and a 100 micron increase (32%) in distance of the similar separation of FIG. 3B. As shown in FIG. 3C, the separation between bond wire 307 and bond wire 312 at package 304 is 300 microns. This is a 100) micron increase (25%) in distance of the similar separation of FIGS. 3A-B. As shown in FIG. 3C, the separation between bond wire 308 and bond wire 310 at semiconductor device 302 is 270 microns. This is a 200 micron increase (285%) in distance of the similar separation of FIG. 3A and a 100 micron (58%) increase in distance of the similar separation of FIG. 3B. As shown in FIG. 3C, the separation between bond wire 308 and bond wire 310 at package 304 is 400 microns. This is a 300 micron increase (300%) in distance of the similar separation of FIG. 3A and a 200 micron increase (200%) in distance of the similar separation of FIG. 3B.

The noise margin for the configuration as illustrated in FIG. 3C may experience a 6 dB improvement over FIG. 38, as crosstalk is reduced due to the increased distance between bond wire 308 and bond wire 310.

In order to reduce issues associated with crosstalk, the separation between bond wires may be increased as will be discussed with reference to FIG. 3D.

FIG. 3D illustrates a conventional bond wire configuration associated with a semiconductor device and a package where bond wire separation is increased over the separation depicted in FIG. 3C.

As shown in FIG. 3D (and similar to the situation of FIGS. 3A-B), the separation between bond wire 307 and bond wire 308 at semiconductor device 302 remains 70 microns and the separation between bond wire 307 and 308 at package 304 remains 100 microns.

As further shown in FIG. 3D, the separation between bond wire 307 and bond wire 312 at semiconductor device 302 is 510 microns. This is a 110 micron increase (27.5%) in distance of the similar separation of FIG. 3A, a 200 micron increase (64.5%) in distance of the similar separation of FIG. 3B and a 100 micron increase (24.3%) in distance of the similar separation of FIG. 3C. As shown in FIG. 3D, the separation between bond wire 307 and bond wire 312 at package 304 is 600 microns. This is a 200 micron increase (50%) in distance of the similar separation of FIGS. 3A-B and a 100 micron increase (25%) in distance of the similar separation of FIG. 3C. The separation between bond wire 308 and bond wire 310 at semiconductor device 302 is 370 microns. This is a 300 micron increase (429%) in distance of the similar separation of FIG. 3A, a 200 micron (118%) increase in distance of the similar separation of FIG. 3B and a 100 micron (37%) increase in distance of the similar separation of FIG. 3C. As shown in FIG. 3D, the separation between bond wire 308 and bond wire 310 at package 304 is 400 microns. This is a 300 micron increase (300%) in distance of the similar separation of FIG. 3A, a 200 micron increase (200%) in distance of the similar separation of FIG. 3B and the same distance of the similar separation of FIG. 3C.

As an example, the noise margin for the configuration as illustrated in FIG. 3C may experience a 5 dB improvement over FIG. 3C, as crosstalk is reduced due to the increased distance between bond wire 308 and bond wire 310.

Clearly, as described above with reference to FIGS. 3A-D, crosstalk may be minimized by increasing the spacing between bond wires. To minimize real estate on semiconductor device 302 package 304 bond wires should ideally be disposed as close to one another as possible. As such, an appropriate spacing between the bond wires must be determined.

Other bond wire configurations may be used in an attempt to reduce coupling. These include overlapping bond wires, as will be described with reference to FIGS. 4A-C FIG. 4A illustrates a conventional overlapped bond wire configuration associated with a semiconductor device and a package.

A bond wire configuration 400 includes a semiconductor device 402, a package 404, a bond wire 407, a bond wire 408, a bond wire 410 and a bond wire 412. Semiconductor device 402 includes a bond pad 414, a bond pad 416, a bond pad 418 and a bond pad 420. Package 404 includes a bond pad 422, a bond pad 424, a bond pad 426 and a bond pad 428.

A signal (or power) line (not shown) on bond pad 414 connects to a signal (or power) line (not shown) on bond pad 422 via bond wire 407. A signal (or power) line (not shown) on bond pad 416 connects to a signal (or power) line (not shown) on bond pad 424 via bond wire 408. A signal (or power) line (not shown) on bond pad 418 connects to a signal (or power) line (not shown) on bond pad 426 via bond wire 410. Bond pad 420 connects to bond pad 428 via bond wire 412.

The separation between bond wire 407 and bond wire 408 and between bond wire 410 and bond wire 412 at semiconductor device 402 is configured for 0 microns. Similarly, the separation between bond wire 407 and bond wire 408 and between bond wire 410 and bond wire 412 at package 404 is 0 microns. The distance between bond wire 407 and bond wire 412 at semiconductor device 402 is configured for 140 microns. The distance between bond wire 407 and bond wire 412 at package 404 is 200 microns. Similarly, the distance between bond wire 408 and bond wire 410 at semiconductor device 402 is 140 microns and the distance between bond wire 408 and bond wire 410 at package 404 is 200 microns.

Semiconductor device 402 provides electrical circuitry for electrical operations. Non-limiting examples for semiconductor device 402 include microprocessor and memory. Package 404 provides carriage and protection for semiconductor device 402. Bond pad 414, 416, 418 and 420 provide electrical connection to circuitry associated with semiconductor device 402. Bond pad 422, 424, 426 and bond pad 428 provide electrical connection to leads associated with package 404. As a non-limiting example, leads may be surface mount capable.

In operation, electrical signals traverse from semiconductor device 402 to bond pads 414, 416, 418 and 420. Furthermore, electrical signals traverse from bond pads 414, 416, 418 and 420 to bond pad 422, 424, 426 and 428 via bond wire 407, 408, 410 and 412, respectively. Furthermore, electrical signals traverse from bond pad 422, 424, 426 and 428 to electrical leads. Furthermore, electrical signals traverse from electrical leads to other electrical and electronic devices located external to package 404. Furthermore, crosstalk may occur between the bond wires and cause signaling errors.

The inductive coupling between the pair of bond wires 407 and 408 and the pair of bond wires 410 and 412 is calculated as −16.76 dB.

Similar to differential pairs, as discussed above with reference to FIGS. 1-2, in order to reduce issues associated with crosstalk in bond wires, the separation between bond wires may be increased, as will be discussed with reference to FIG. 4B.

FIG. 4B illustrates a conventional overlapped bond wire configuration associated with a semiconductor device and a package where bond wire separation is increased over the separation depicted in FIG. 4A.

The separation between bond wire 407 and bond wire 408 at semiconductor device 402 remains 0 microns and the separation between bond wire 407 and 408 at package 404 remains 0 microns as described with reference to FIG. 4A.

The separation between bond wire 407 and bond wire 412 at semiconductor device 402 is 340 microns. This is a 200 micron increase (143%) in distance of the similar separation of FIG. 4A. As shown in FIG. 48, the separation between bond wire 407 and bond wire 412 at package 404 is 400 microns. This is a 200 micron increase (100%) in distance of the similar separation of FIG. 4A.

The inductive coupling between the pair of bond wires 407 and 408 and the pair of bond wires 410 and 412 is calculated as −27.21 dB, which is an improvement of −10.45 dB over the configuration of FIG. 4A. The increased separation between the bond wires increases the noise margin, decreases the coupling and decreases crosstalk.

In order to further reduce issues associated with crosstalk, the separation between bond wires may be further increased as will be discussed with reference to FIG. 4C.

FIG. 4C illustrates a conventional overlapped bond wire configuration associated with a semiconductor device and a package where bond wire separation is increased over the separation depicted in FIG. 4B.

The separation between bond wire 407 and bond wire 408 at semiconductor device 402 remains 0 microns and the separation between bond wire 407 and 408 at package 404 remains 0 microns as described with reference to FIG. 4A.

The separation between bond wire 407 and bond wire 412 at semiconductor device 402 is 540 microns. This is a 400) micron increase (285%) in distance of the similar separation of FIG. 4A and a 200 micron increase (58.8%) in distance of the similar separation of FIG. 4B. As shown in FIG. 4C, the separation between bond wire 407 and bond wire 412 at package 404 is 600 microns. This is a 400 micron increase (200%) in distance of the similar separation of FIG. 4A and a 200 micron increase (50%) in distance of the similar separation of FIG. 4B.

The inductive coupling between the pair of bond wires 407 and 408 and the pair of bond wires 410 and 412 pair is calculated as −32.13 dB, which is an improvement of −4.92 dB over the configuration of FIG. 4B. The increased separation between the bond wires increases the noise margin, decreases the coupling and decreases crosstalk.

FIG. 4C illustrates a conventional overlapped bond wire configuration associated with a semiconductor device and a package where bond wire separation is increased over the separation depicted in FIG. 4B resulting in increased noise margin and decreased crosstalk.

Clearly, as described above with reference to FIGS. 6A-C, crosstalk may be minimized by increasing the spacing between bond wires. To minimize real estate on semiconductor device 402 package 404 bond wires should ideally be disposed as close to one another as possible. As such, an appropriate spacing between the bond wires must be determined.

Similar to methods of reducing crosstalk for differential pairs as discussed above with reference to FIGS. 1-2, crosstalk originating from bond wires may be reduced with orthogonal crossovers. This will be discussed with reference to FIGS. 5A-D FIG. 5A illustrates a conventional crossed bond wire configuration associated with a semiconductor device and a package.

A bond wire configuration 500 includes a semiconductor device 502, a package 504, a differential pair 505 and a differential pair 506. Differential pair SOS includes a bond wire 507 and a bond wire 508. Differential pair 506 includes a bond wire 510 and a bond wire 512. Semiconductor device 502 includes a plurality of bond pads to which one end of the respective bond wires are adhered to. Package 504 includes a plurality of bond pads to which one end of the respective bond wires are adhered to.

For this configuration, bond wire 507 crosses over and above bond wire 508, whereas bond wire 512 crosses over and above bond wire 510.

The separation between bond wire 507 and bond wire 512 at semiconductor device 502 is 210 microns. The separation between bond wire 508 and bond wire 510 at package 504 is 400 microns.

The inductive coupling between the pair of bond wires 507 and 508 and the pair of bond wires 510 and 512 is calculated as −18.79 dB.

The coupling between the bond wires is dependent upon the point of crossing between the bond wires and upon the orientation between the bond wires. A variety of crossing bond wire configurations will be described with reference to FIGS. 5B-D below which have a variety of coupling values.

FIG. 5B illustrates a conventional crossed bond wire configuration associated with a semiconductor device and a package where bond wire orientation is varied as compared to FIG. 5A.

As shown in FIG. 5B, the separation between the bond wires at semiconductor device 502 and at package 504 is the same as described with reference to FIG. 5A, however the height of the bond wires is varied slightly.

In FIG. 5B, the inductive coupling between the pair of bond wires 507 and 508 and the pair of bond wires 510 and 512 pair is calculated as −17.53 dB. Furthermore, the −17.53 dB coupling is 1.26 dB greater than the configuration described with reference to FIG. 5A even though the difference between FIG. 5A and FIG. 5B is related to the height of the bond wires and not the separation between the bond wires at the bond pads.

FIG. 5C illustrates another example conventional crossed bond wire configuration associated with a semiconductor device and a package.

As shown in FIG. 5C, the separation between the pair of bond wires 507 and 508 and the pair of bond wires 510 and 512 is increased as compared to FIGS. 5A-B. The separation between the pair of bond wires 507 and 512 at semiconductor device 502 has been increased to 240 microns. This is a 30 micron increase (14%) in distance of the similar separation of FIGS. 5A-B. As shown in FIG. 5C, the separation between bond wire 508 and bond wire 510 at package 504 remains 400 microns.

The inductive coupling between the pair of bond wires 507 and 508 and the pair of bond wires 510 and 512 is calculated as −24.54 dB. The −24.54 dB coupling is 5.75 dB less than FIG. 5A and is 7.01 dB less than FIG. 5B.

FIG. 5D illustrates another example conventional crossed bond wire configuration associated with a semiconductor device and a package.

The separation between bond wire 507 and bond wire 512 at semiconductor device 502 is 240 microns, the same as described with reference to FIG. 3C. The separation between bond wire 508 and bond wire 510 at package 504 is 400 microns. The 400 microns is an increase of 100 microns over the separation as described with reference to FIG. 3C.

In FIG. 3C, the larger separation is 500 microns, whereas here the larger separation is 400 microns—meaning a tighter overall bondwire pitch while the isolation has improved from −23 dB to −27 dB.

The inductive coupling between the pair of bond wires 507 and 508 and the pair of bond wires 510 and 512 is calculated as −26.47 dB. The −26.48 dB coupling is 1.93 dB less than FIG. 5C.

What is needed is a system and method for decreasing crosstalk associated with differential pairs and bond wires.

BRIEF SUMMARY

The present invention provides a system and method for decreasing crosstalk associated with differential pairs and bond wires.

The present invention provides a system is provided for use with circuit layout design data including a set of differential pairs and a set of bond wire pairs. A layout portion can receive the circuit layout design data. A crosstalk calculating portion can determine a first amount of crosstalk in a circuit corresponding to the circuit layout design data. A modifier can modify the circuit layout design data into modified circuit layout design data such that one of the set of differential pairs and the set of bond wire pairs includes a crossover. The crosstalk calculating portion can further determine a second amount of crosstalk in a circuit corresponding to the modified circuit layout design data. An optimizer can compare the first amount of crosstalk with the second amount of crosstalk to generate optimized circuit layout design data. A layout designer can output the optimized circuit layout design data.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 6A-B illustrate modification of a differential pair circuit in order to reduce cross talk;

FIG. 8 illustrates an example system for reducing crosstalk associated with a circuit layout, in accordance with an aspect of the present invention;

FIG. 10 is a graph for the example crossed bond wire configuration as described with reference to FIG. 9, in accordance with an aspect of the present invention;

FIG. 11 illustrates an example system for reducing crosstalk associated with bond wires, in accordance with an aspect of the present invention:

FIG. 12 illustrates an example system for reducing crosstalk associated with bond wires and with differential pairs, in accordance with an aspect of the present invention.

DETAILED DESCRIPTION

Figure 1A:
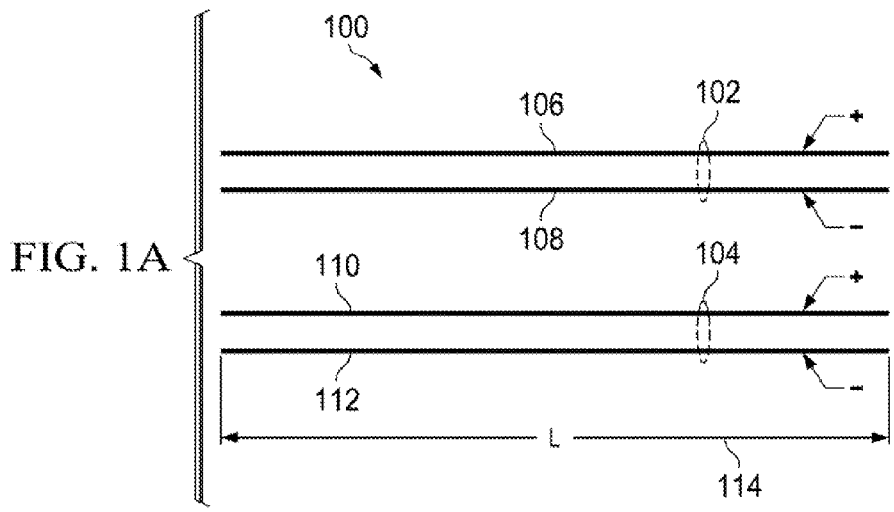
FIGS. 1A-C illustrates an example conventional transmission line system.
Figure 1B:
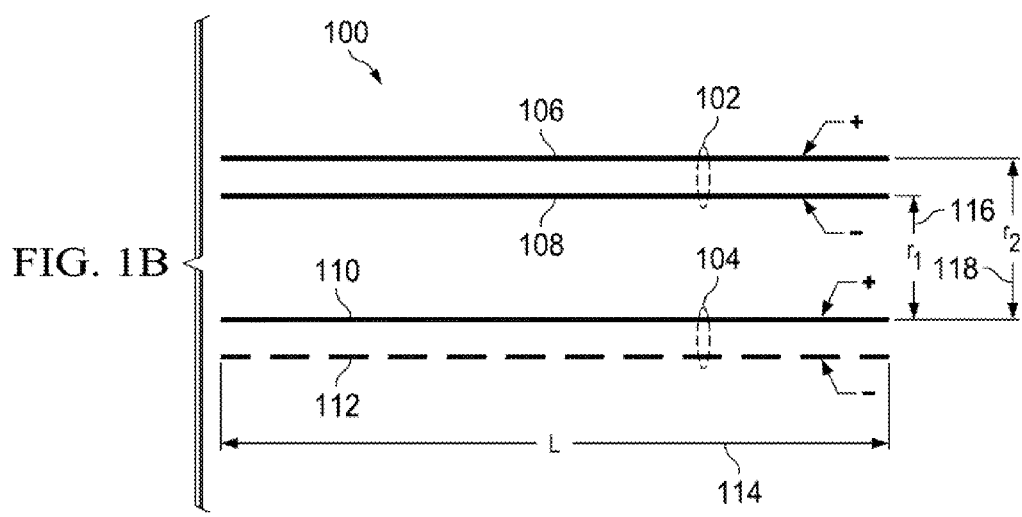
Figure 1C:
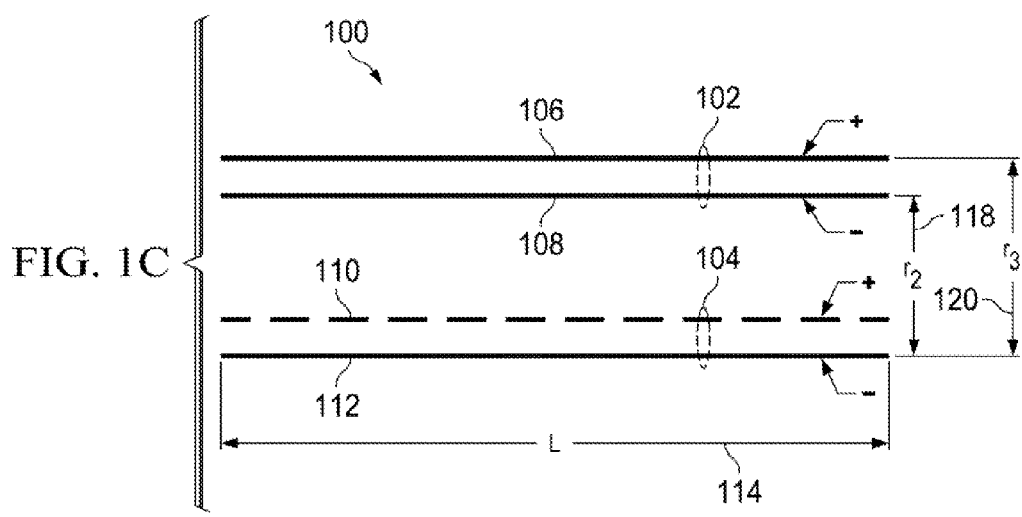
Figure 2:
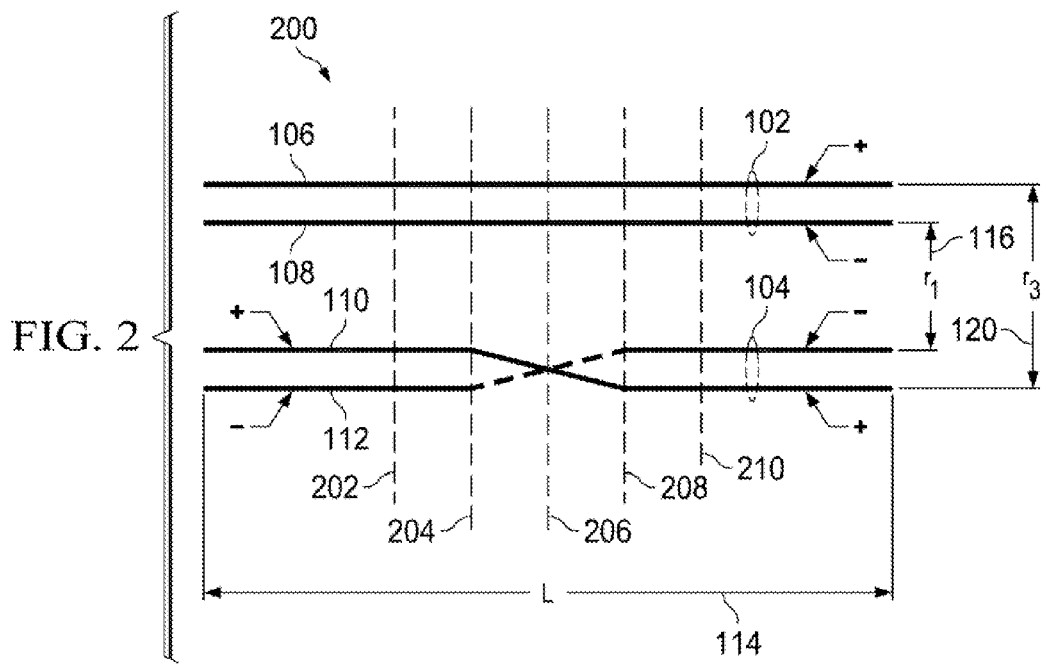
FIG. 2 illustrates an example conventional transmission line system, wherein one set of signal traces include a crossover.
Figure 3A:
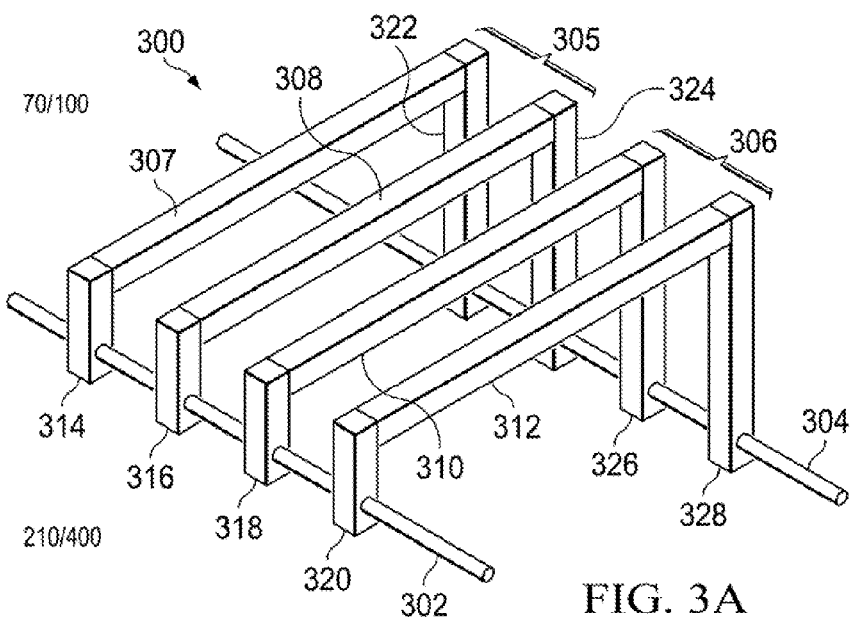
FIGS. 3A-D illustrate a conventional bond wire configuration associated with a semiconductor device and a package.
Figure 3B:
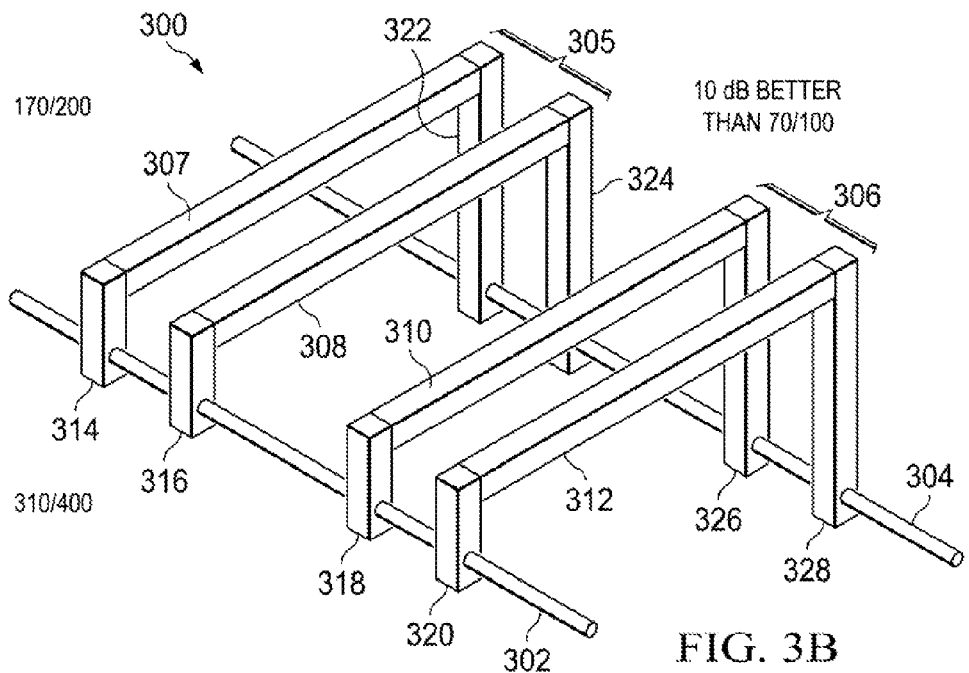
Figure 3C:
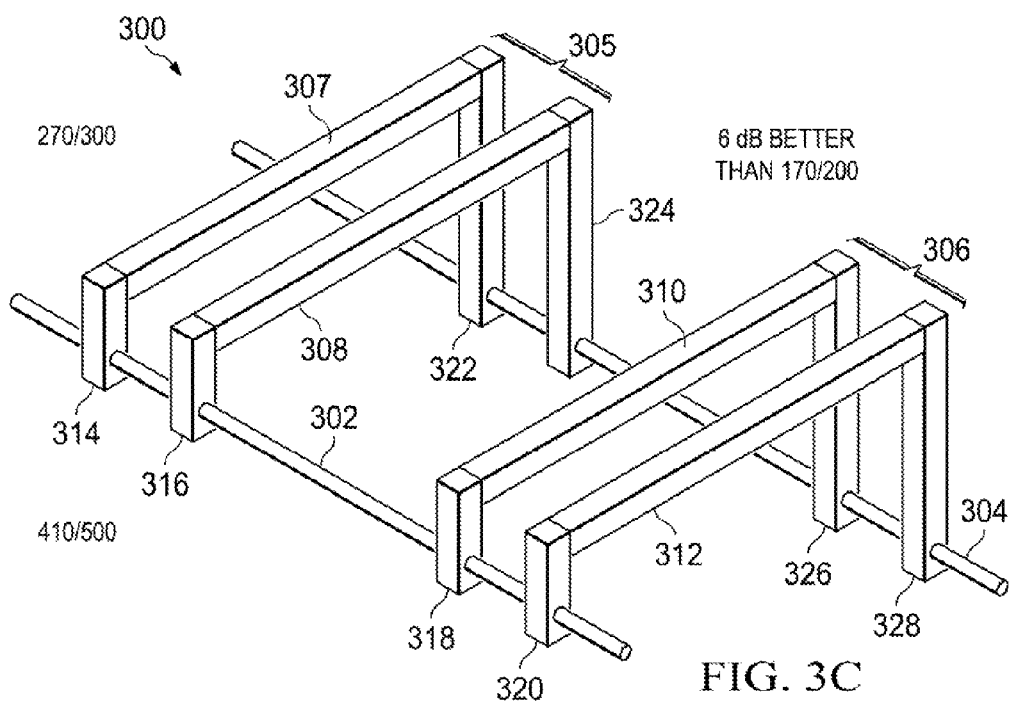
Figure 3D:
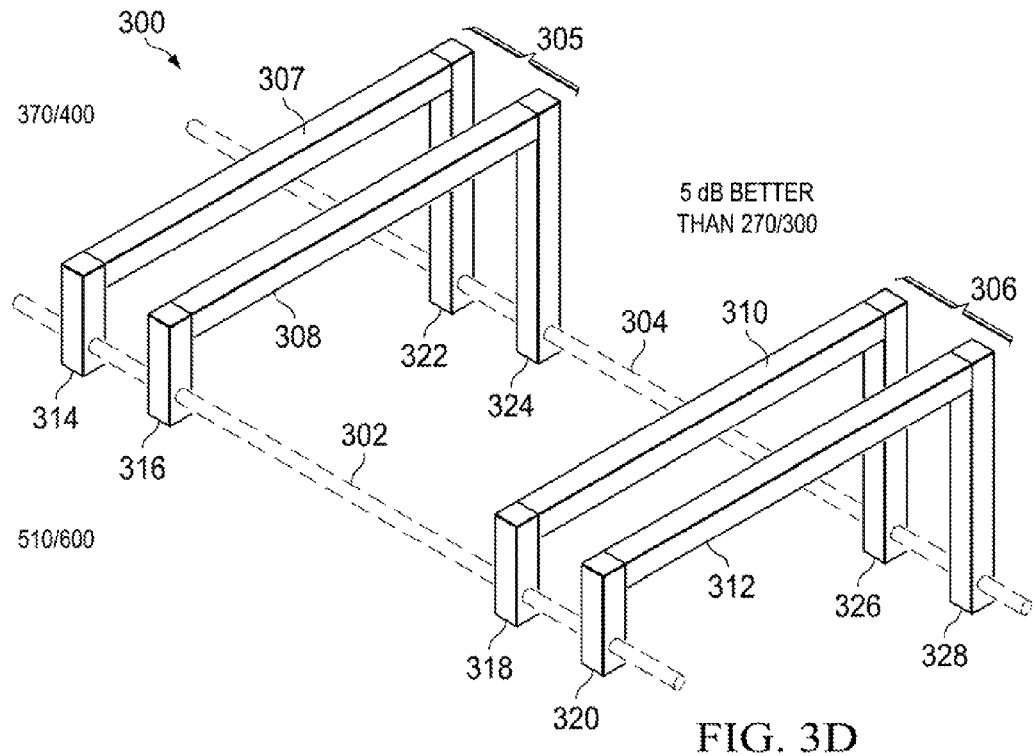
Figure 4A:
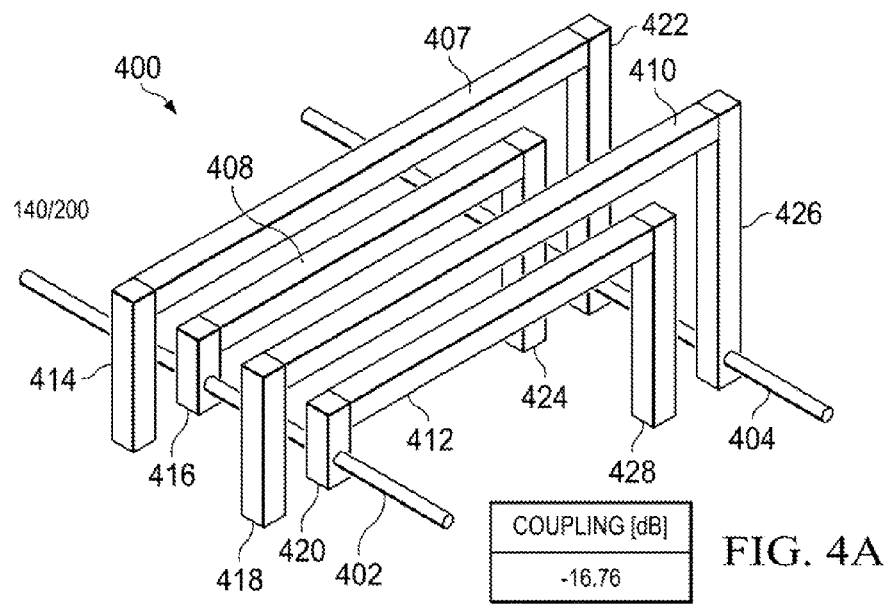
FIGS. 4A-C illustrates a conventional overlapped bond wire configuration associated with a semiconductor device and a package.
Figure 4B:
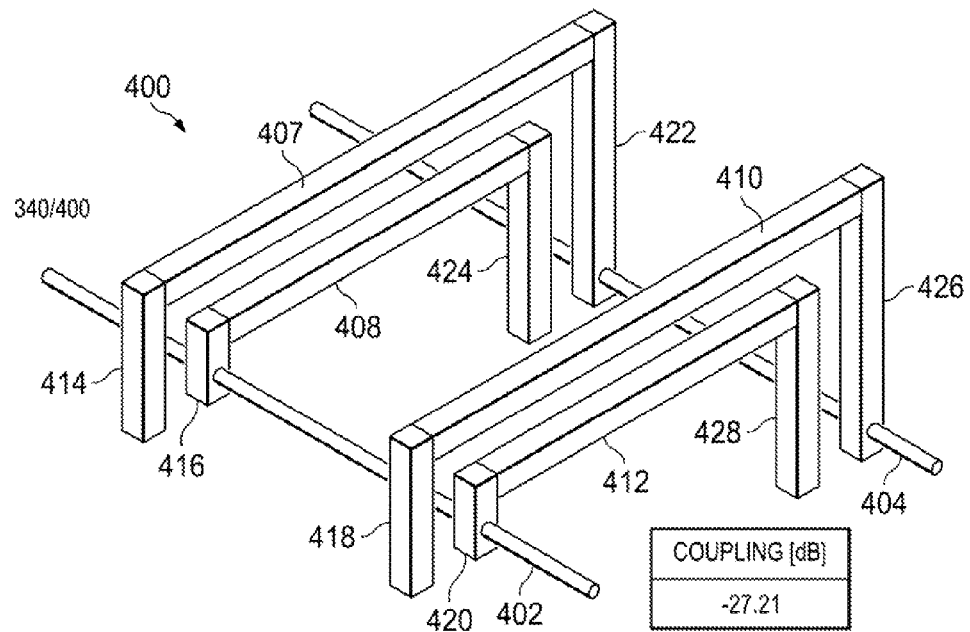
Figure 4C:
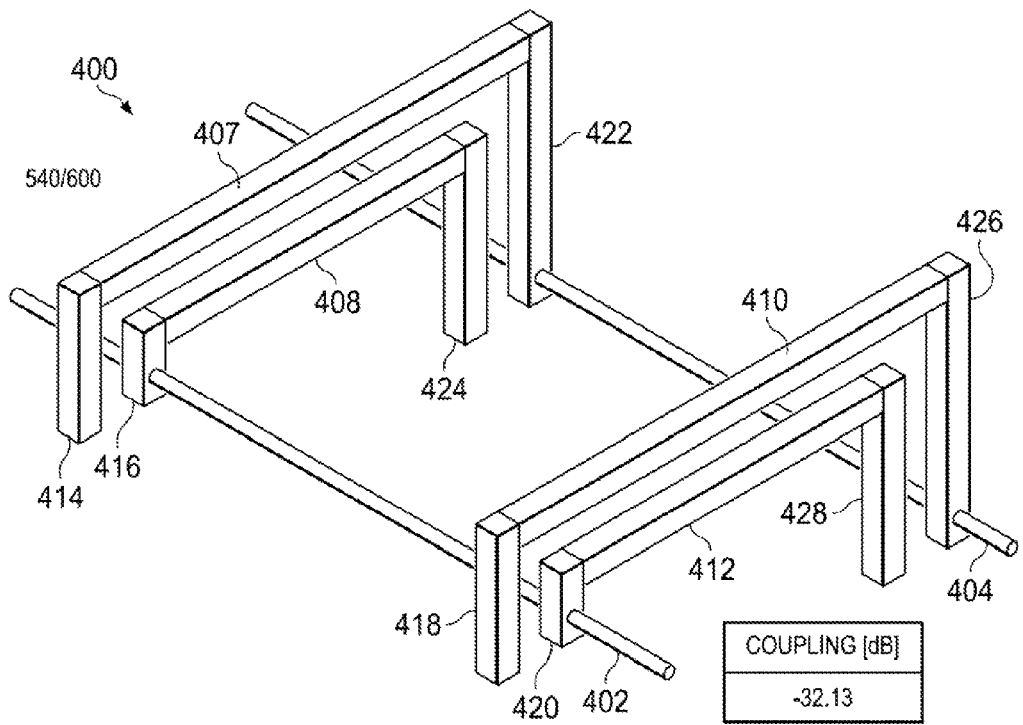
Figure 5A:
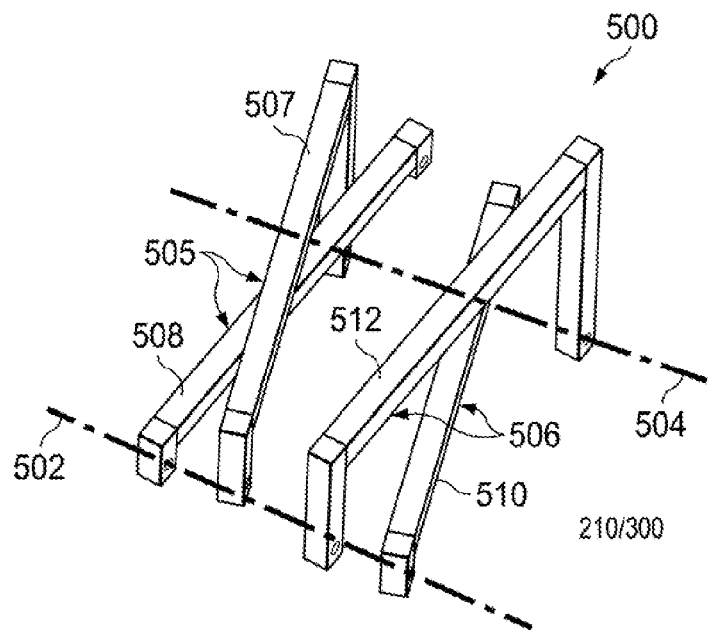
FIGS. 5A-D illustrate a conventional crossed bond wire configuration associated with a semiconductor device and a package.
Figure 5B:
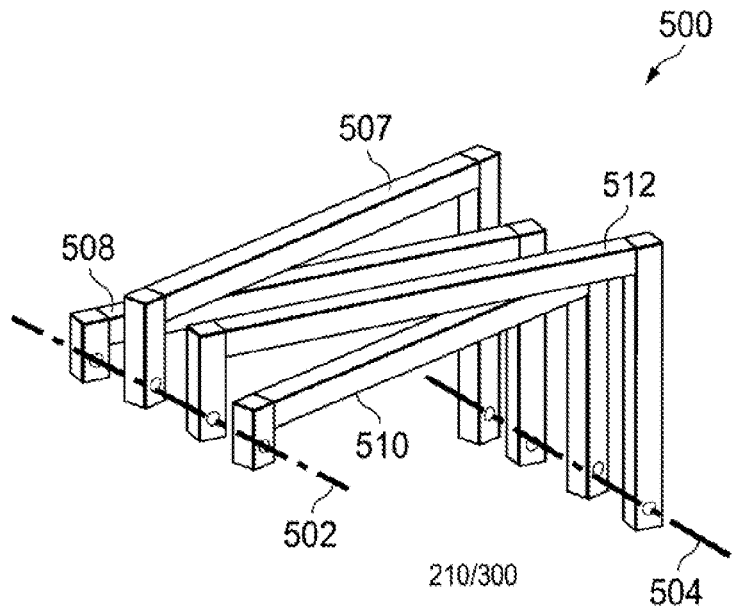
Figure 5C:
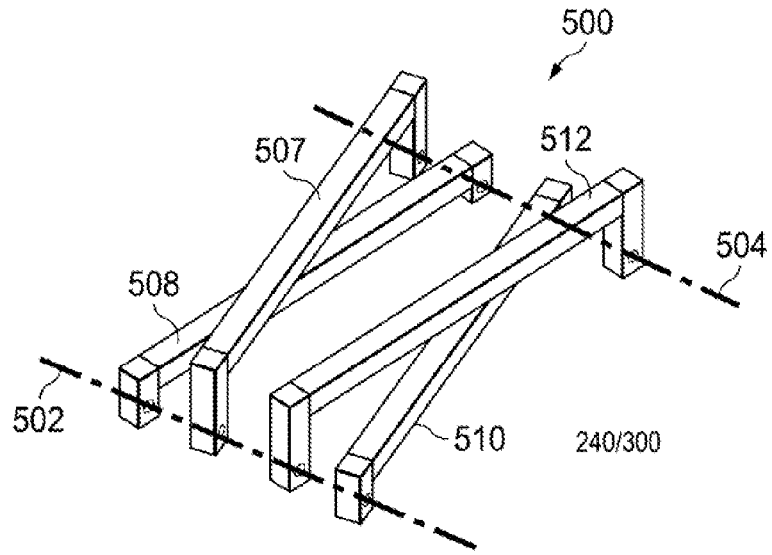
Figure 5D:
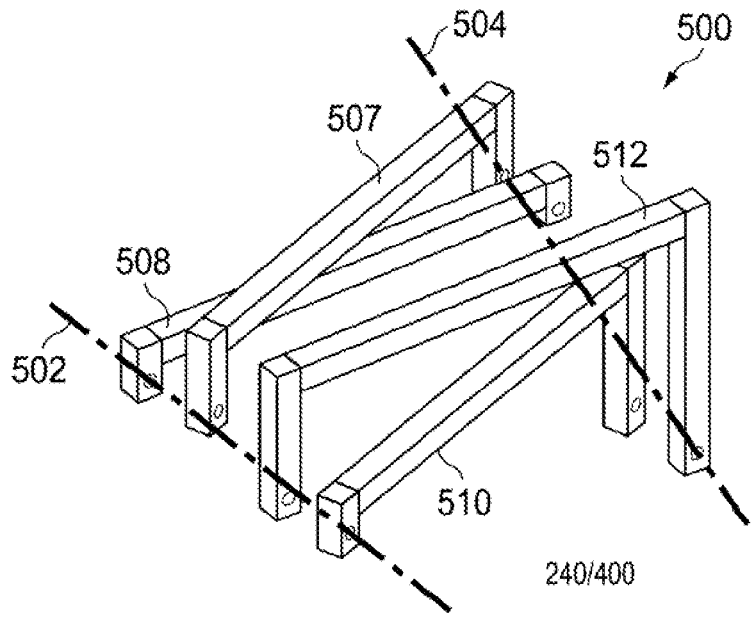

In accordance with aspects of the present invention, a system and method are presented for reducing crosstalk associated with differential pairs and bond wires via crossing of signal traces.

Crossovers to reduce crosstalk in differential pairs and bond wires is known. The present invention provides a method to reduce and/or minimize crosstalk on a system basis. Furthermore, the reduction or minimization of crosstalk is performed by analyzing the crosstalk with crossovers located at predetermined points and determining the optimum place to position a crossover or crossovers. Further discussion with respect to reducing and minimizing crosstalk on a system bases is further described with reference to FIGS. 6-13.

FIGS. 6A-B illustrate modification of a differential pair circuit in order to reduce cross talk.

FIG. 6A illustrates an example circuit layout configuration 600.

Circuit layout configuration 600 includes a differential pair 601, a differential pair 602, and a via 603.

Differential pair 601 includes a signal trace 604 and a signal trace 605. Differential pair 602 includes a signal trace 606 and a signal trace 607.

Differential pair 601 and differential pair 602 may be located in different layers of an electrical layout. Differential pair 601 and differential pair 602 traverse three sections noted as a section 608, a section 610 and a section 612. Section 608 is located between a cross section 614 and a cross section 616. Section 610 is located between cross section 616 and a cross section 618. Section 612 is located between cross section 618 and a cross section 620. Differential pair 601 and differential pair 602 are separated by a distance 622 within section 608. Differential pair 601 and differential pair 602 are separated by a distance 624 within section 612. Differential pair 601 and differential pair 602 are separated by distance 622 at cross section 616 with the distance linearly increasing until cross section 618 at which the distance between the differential pairs is distance 624. The distance associated with distance 622 is smaller than the distance associated with distance 624. Via 603 is located partially within section 610 and partially within section 612 with a larger portion of via 603 located within section 612.

Differential pair 601 and differential pair 602 provide a transmission medium for transferring an electrical signal. Via 603 provides a mechanism for traversing an electrical conductor from one layer to another layer of a circuit layout. Signal traces 604, 605, 606 and 607 provide for traversal of respective electrical signals.

Using Equation (1) described previously, the amount of cross talk between differential pair 601 and differential pair 602 may be calculated.

FIG. 6B illustrates modifying the conventional circuit as described with reference to FIG. 6A in order to reduce cross talk.

FIG. 6B illustrates example circuit layout configuration 600.

As compared to FIG. 6A, section 608 has been further sectioned into a section 626, a section 628, a section 360 and a section 362. Section 626 is located between cross section 614 and cross section 616. Section 628 is located between cross section 616 and a cross section 634. Section 360 is located between cross section 634 and a cross section 636. Section 632 is located between cross section 636 and a cross section 638.

Cross talk can be reduced between differential pair 601 and 602 by crossing the signal traces associated with the differential pairs. For example, crossing signal trace 606 and signal trace 607 at a point 640 may reduce cross talk by a first amount. Furthermore, crossing signal trace 604 and 605 at a point 642 may reduce cross talk a second amount. Furthermore, crossing signal trace 604 and 605 at a point 644 may reduce cross talk a third amount. Furthermore, crossing signal trace 606 and 607 at a point 646 may reduce cross talk a fourth amount. Furthermore, crossing signal trace 604 and 605 at cross section 636 may reduce cross talk a fifth amount. For this example, cross talk may be reduced the most of the five examples at cross section 636 where signal traces 604 and 605 initiate switching at cross section 634, crossover at cross section 636 and complete the switch over at cross section 638.

For the sake of discussion, the cross talk between differential pair 601 and differential pair 602 has been reduced the most of the five potential cross over positions due to the crossing of the differential pairs at cross section 636. The location and architecture for the crossing of the differential pairs is selected from a plurality of potential crossing points and architectures and the selected crossing point and architecture represents the lowest cross talk from the group of potential crossing points and architectures.

In some embodiments, the aggregate cross talk between the differential pairs may be reduced by performing a plurality of crossovers, for example at point 640 and 642.

FIG. 6B illustrates example circuit layout configuration where a crossing point and an architecture are selected from a plurality of potential crossing points and architectures in order to select the lowest cross talk.

Figure 7A:
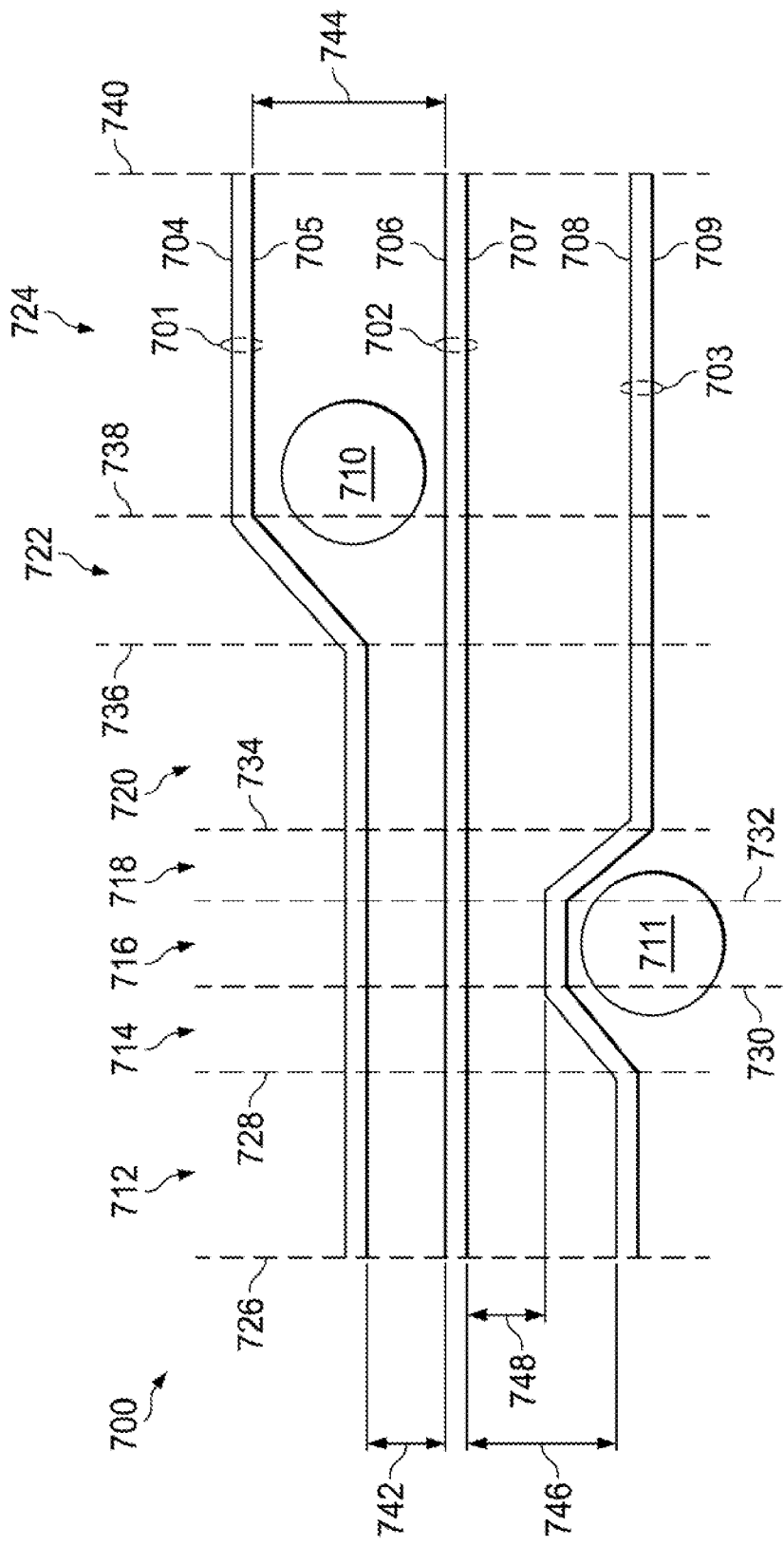
FIGS. 7A-B illustrate modification of a plurality of differential pair circuits in order to reduce cross talk.
Figure 7B:
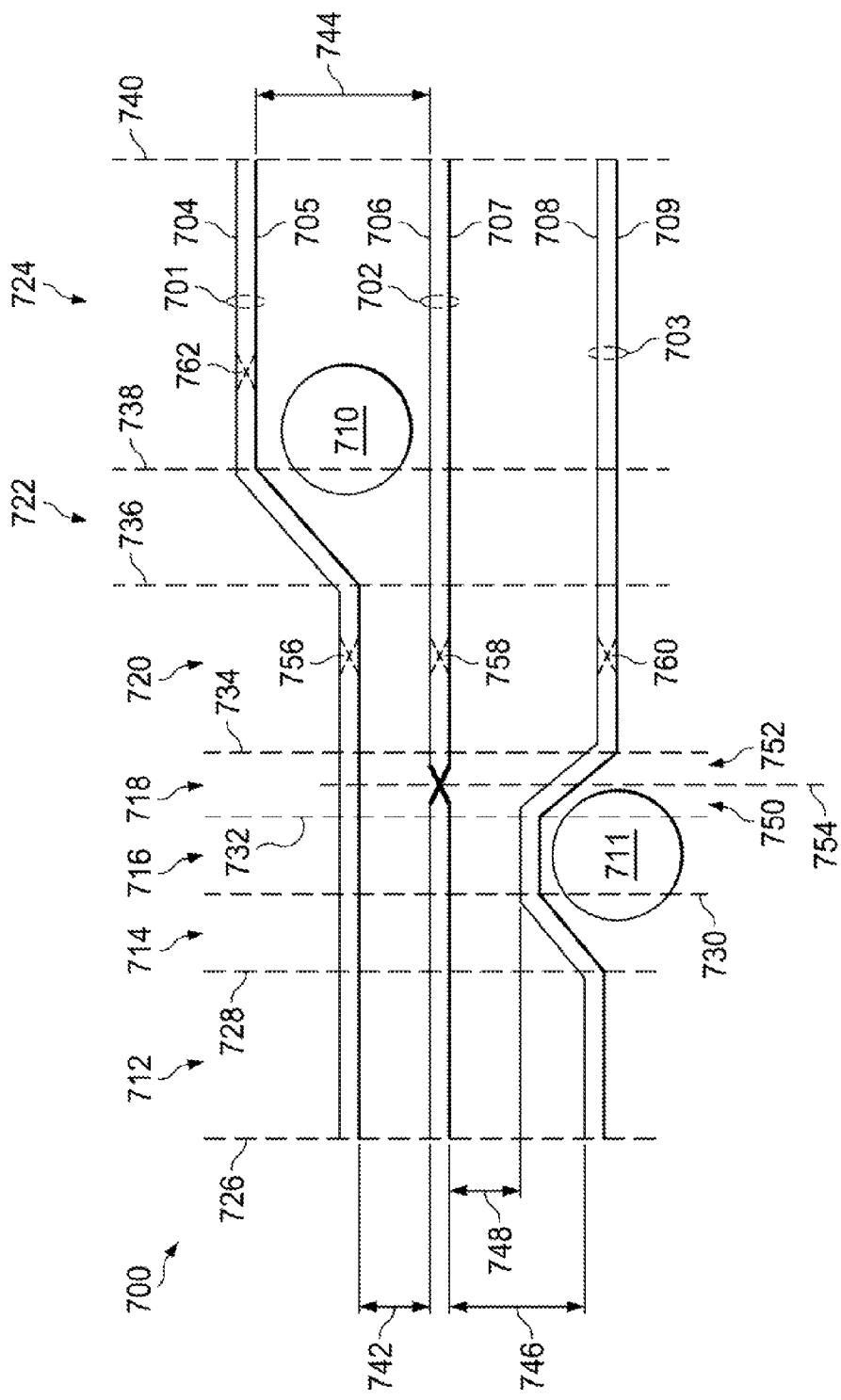

FIGS. 7A-B illustrate modification of a plurality of differential pair circuits in order to reduce cross talk.

FIG. 7A illustrates an example circuit layout configuration 700.

Circuit layout configuration 700 includes a differential pair 701, a differential pair 702, a differential pair 703 a via 710 and a via 711.

Differential pair 701 includes a signal trace 704 and a signal trace 705. Differential pair 702 includes a signal trace 706 and a signal trace 707. Differential pair 703 includes a signal trace 708 and a signal trace 709.

Differential pair 701, differential pair 702 and differential pair 703 may be located in different layers of an electrical layout.

Differential pairs 701, 702 and 703 traverse seven sections noted as a section 712, a section 714, a section 716, a section 718, a section 720, a section 722 and a section 724. Section 712 is located between a cross section 726 and a cross section 728. Section 714 is located between cross section 728 and a cross section 730. Section 716 is located between cross section 730 and a cross section 732. Section 718 is located between cross section 732 and a cross section 734. Section 720 is located between cross section 734 and a cross section 736. Section 722 is located between cross section 736 and a cross section 738. Section 724 is located between cross section 738 and a cross section 740. Differential pair 701 and differential pair 702 are separated by a distance 742 within sections 712, 714, 716, 718 and 720. Differential pair 701 and differential pair 702 are separated by a distance 744 within section 724. Within section 722, the distance between differential pair 701 and differential pair 702 increases linearly from distance 742 to distance 744 as the pairs traverse from cross section 736 to cross section 738. Differential pair 702 and differential pair 703 are separated by a distance 746 within sections 712, 720, 722 and 724. Differential pair 702 and differential pair 703 are separated by a distance 748 within section 716. Within section 714, the distance between differential pair 702 and differential pair 703 decreases linearly from distance 746 to distance 748 as differential pairs 702 and 703 traverse from cross section 728 to cross section 730. Within section 718, the distance between differential pair 702 and differential pair 703 increases linearly from distance 748 to distance 746 as differential pairs 702 and 703 traverse from cross section 732 to cross section 734. The distance associated with distance 742 is smaller than the distance associated with distance 746. The distance associated with distance 746 is smaller than the distance associated with distance 744. Via 711 is located partially within sections 714, 716 and 718. Via 710 is located partially in section 722 and section 724 with a larger portion located within section 724.

Differential pairs 701, 702 and 703 provide transmission mediums for transferring respective electrical signals.

Signal traces 704, 705, 706, 707, 708 and 709 provide for traversal of respective electrical signals.

Using Equation (1) described previously, the amount of cross talk between differential pair 701 and differential pair 702 may be calculated. Furthermore, using Equation (1), the amount of cross talk between differential pair 702 and 703 may be calculated and the cross talk between differential pair 701 and 703 may be calculated.

FIG. 7A illustrates an example circuit layout configuration where the cross talk between a plurality of differential pairs may be determined.

FIG. 7B illustrates modifying the circuit as described with reference to FIG. 7A in order to reduce cross talk.

FIG. 7B illustrates example circuit layout configuration 700.

As compared to FIG. 7A, section 718 has been further sectioned into a section 750 and a section 752. Section 750 is located between cross section 732 and a cross section 754. Section 752 is located between cross section 754 and cross section 734.

Cross talk can be reduced between differential pair 701, 702 and 703 by crossing the signal traces associated with the differential pairs. For example, crossing signal trace 704 and signal trace 705 at a point 756 may reduce cross talk a first amount. Furthermore, crossing signal trace 706 and 707 at a point 758 may reduce cross talk a second amount. Furthermore, crossing signal trace 708 and 709 at a point 760 may reduce cross talk a third amount. Furthermore, crossing signal trace 704 and 705 at a point 762 may reduce cross talk a fourth amount. Furthermore, crossing signal trace 706 and 707 at cross section 754 may reduce cross talk a fifth amount. For this example, cross talk may be reduced the most of the five examples at cross section 754 where signal traces 706 and 707 initiate switching at cross section 732, crossover at cross section 754 and complete the switch over at cross section 734.

The aggregate cross talk between differential pair 701, 702 and 703 has been reduced due to the crossing of the differential pairs at cross section 754. The location and architecture for the crossing of the differential pairs is selected from a plurality of potential crossing points and architectures and the selected crossing point and architecture represents the lowest cross talk from the group of potential crossing points and architectures.

In some embodiments, the aggregate cross talk between the differential pairs may be reduced by performing a plurality of crossovers, for example at point 756 and 758.

FIG. 7B illustrates example circuit layout configuration where a crossing point and an architecture are selected from a plurality of potential crossing points and architectures in order to select the lowest cross talk associated with a plurality of differential pairs.

FIG. 8 illustrates a system for implementing the cross talk modification for differential pairs as described with reference to FIGS. 6A-7B.

FIG. 8 illustrates an example system 800 for reducing crosstalk associated with a circuit layout, in accordance with an aspect of the present invention.

System 800 includes a differential pair layout portion 802, a selector portion 804, an integrator portion 806, a memory portion 808, an optimizer portion 810, a layout designer portion 812 and a modifier portion 814. Memory portion 808 includes a cross-over placement portion 815 and a cross talk portion 816.

Selector portion 804 receives information from differential pair layout portion 802 via a communication channel 817 and from integrator portion 806 via a communication channel 818. Integrator portion 806 receives information from selector portion 804 via a communication channel 820. Memory portion 808 communicates bi-directionally with integrator portion 806 via a communication channel 822 and with optimizer portion 810 via a communication channel 824. Layout designer portion 812 receives information from optimizer portion 810 via a communication channel 826 and from differential pair layout portion 802 via a communication channel 828. Modifier portion 814 receives information from integrator portion 806 via a communication channel 830. Differential pair layout portion 802 receives information from modifier portion 814 via a communication channel 832. Layout designer portion 812 communicates information to external entities via a communication channel 834.

Differential pair layout portion 802 provides information associated with a plurality of potential differential pair configurations from which to select. Selector portion 804 selects a differential pair configuration for application. Integrator portion 806 integrates between differential pairs in order to determine the crosstalk between the differential pairs. Memory portion 808 receives, retrieves and stores information. Optimizer portion 810 performs optimization associated with reducing cross talk. Layout designer portion 812 performs circuit layouts. Modifier portion 814 modifies differential pair layouts. Cross-over placement portion 815 receives, retrieves and stores information associated with cross-over placement. Cross talk portion 816 stores information associated with cross talk.

In operation, differential pair layout portion 802 contains a plurality of potential layout scenarios for differential pairs. Selector portion 804 selects a scenario for laying out differential pairs. Scenario may include crossing over differential pairs as described with reference to FIG. 6B and FIG. 78. Integrator portion 806 calculates Equation (1) in order to determine the amount of crosstalk between differential pairs. Integrator portion 806 stores information into memory portion 808 including layout information and cross-over placements stored in cross-over placement portion 815 and associated cross talk information stored into cross talk portion 816. Modifier portion 814 receives placement information and cross talk information from integrator portion 806 and may add or remove layout scenarios from differential pair layout portion 802.

The process is repeated for available layout scenarios with associated information stored in memory portion 808, cross-over placement portion 815 and cross talk portion 816. Following the performance of the cross talk calculation for potential layout scenarios, optimizer portion 810 determines the scenario with the smallest amount of cross talk and communicates the information to layout designer portion 812. Layout designer portion 812 performs detailed layout of circuit based upon the selected scenario.

Issues with crosstalk may additionally be reduced via configuration of crossed bond wires as will be discussed with reference to FIG. 9.

Figure 9:
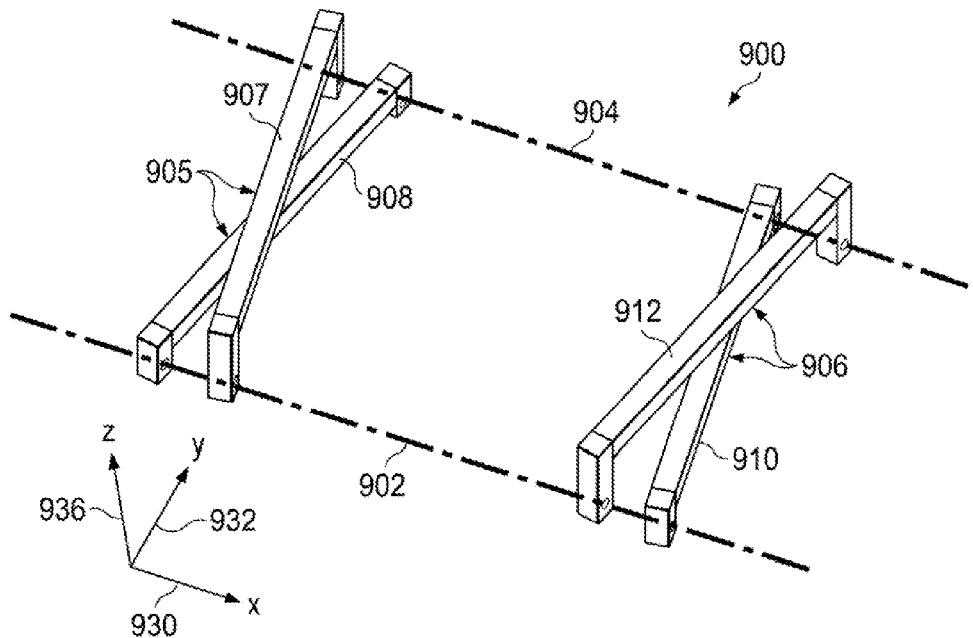
FIG. 9 illustrates an example crossed bond wire configuration, in accordance with an aspect of the present invention.

FIG. 9 illustrates an example crossed bond wire configuration 900, in accordance with an aspect of the present invention.

Crossed bond wire configuration 900 includes a semiconductor device 902, a package 904, a differential pair 905 and a differential pair 906. Differential pair 905 includes a bond wire 907 and a bond wire 908. Differential pair 906 includes a bond wire 910 and a bond wire 912. Semiconductor device 902 includes a plurality of bond pads to which one end of the respective bond wires are adhered to. Package 904 includes a plurality of bond pads to which one end of the respective bond wires are adhered to.

Semiconductor device 902 provides electrical circuitry for electrical operations. Non-limiting examples for semiconductor device 902 include microprocessor and memory. Package 904 provides carriage and protection for semiconductor device 902. Differential pair 905 provides a transmission medium for transferring an electrical signal. Differential pair 906 provides a transmission medium for transferring an electrical signal.

For this configuration, bond wire 907 crosses over and above bond wire 908 and bond wire 912 crosses over and above bond wire 910.

Semiconductor device 902 provides electrical circuitry for electrical operations. Non-limiting examples for semiconductor device 902 include microprocessor and memory. Package 904 provides carriage and protection for semiconductor device 902. Bond wires 907, 908, 910 and 912 provide connection between bond pads located on semiconductor device 902 and package 904.

Bond wires 907, 908, 910 and 912 are oriented with respect to an x-axis 930 with units of microns, with respect to a y-axis 932 with units of microns and with respect to a z-axis 934 with units of microns.

A table 938 contains location information for bond wires 907, 908, 910 and 912.

A table portion 940 provides location information associated with bond wire 907. A table portion 942 provides location information associated with bond wire 908. A table portion 944 provides location information associated with bond wire 910. A table portion 946 provides location information associated with bond wire 912.

Bond wire 907 initiates at a (x,y,z) location with coordinates of (−220,0,175), then traverses to location (−220,0,225), then traverses to (−200,700,25) and then terminates at (−200,700,0).

Bond wire 908 initiates at a (x,y,z) location with coordinates of (−150,0,175), then traverses to location (−150,0,250), then traverses to (−300,600,125) and then terminates at (−300,600,0).

Bond wire 910 initiates at a (x,y,z) location with coordinates of (200,0,175), then traverses to location (220,0,225), then traverses to (200,700,25) and then terminates at (200, 700,0).

Bond wire 912 initiates at a (x,y,z) location with coordinates of (150,0,175), then traverses to location (150,0,250), then traverses to (300,600,125) and then terminates at (300, 600,0).

The separation between bond wire 907 and bond wire 912 at semiconductor device 902 is 370 microns. The separation between bond wire 908 and bond wire 910 at package 904 is 500 microns.

The inductive coupling between the pair of bond wires 907 and 908 pair and the pair of bond wires 910 and 912 pair is calculated as −67.96 dB.

Accordingly, the bond wire arrangement of FIG. 9, having an inductive coupling calculated as −67.96 dB for the bond wire arrangement of FIG. 9 is much smaller than the inductive coupling calculated as −26.47 dB for the bond wire arrangement of FIG. 5.

FIG. 10 is a graph for the example crossed bond wire configuration as described with reference to FIG. 9, in accordance with an aspect of the present invention.

As shown in FIG. 10, graph 1000 has an x-axis 1002 corresponding to the position of a first wire alone first axis, a y-axis 1004 corresponding to the position of a second wire and a z-axis 1006 corresponding to the coupling between the two wires (in −dB) which is to be maximized. The graph indicates that for varying wire junction locations, the coupling between the wires can be optimized by varying a simple set of parameters. This graph shows only two parameters (perhaps two of the wire vertices), but this can be generalized to as many vertices as are necessary and practical for the wire bonding equipment available.

FIG. 11 illustrates an example system 1100 for reducing crosstalk associated with bond wires, in accordance with an aspect of the present invention.

System 1100 includes a bond wire pair layout portion 1102, selector portion 804, integrator portion 806, memory portion 808, optimizer portion 810, layout designer portion 812 and modifier portion 814. Memory portion 808 includes cross-over placement portion 815 and cross talk portion 816.

Selector portion 804 receives information from bond wire pair layout portion 1102 via communication channel 817 and from integrator portion 806 via communication channel 818. Integrator portion 806 receives information from selector portion 804 via communication channel 820. Memory portion 808 communicates bi-directionally with integrator portion 806 via communication channel 822 and with optimizer portion 810 via communication channel 824. Layout designer portion 812 receives information from optimizer portion 810 via communication channel 826 and from bond wire pair layout portion 1102 via communication channel 828. Modifier portion 814 receives information from integrator portion 806 via communication channel 830. Bond wire pair layout portion 1102 receives information from modifier portion 814 via communication channel 832. Layout designer portion 812 communicates information to external entities via communication channel 834.

Bond wire pair layout portion 1102 provides information associated with a plurality of potential bond wire pair configurations from which to select. Selector portion 804 selects a bond wire pair configuration for application. Integrator portion 806 performs an integration between bond wires in order to determine the crosstalk between the bond wires. Memory portion 808 receives, retrieves and stores information. Optimizer portion 810 performs optimization associated with reducing bond wire cross talk. Layout designer portion 812 performs bond wire layouts. Modifier portion 814 modifies bond wire pair layouts. Cross-over placement portion 815 receives, retrieves and stores information associated with bond wire cross-over placement. Cross talk portion 816 stores information associated with cross talk.

In operation, bond wire pair layout portion 1102 contains a plurality of potential layout scenarios for bond wires. Selector portion 804 selects a scenario for laying out the bond wire. Scenario may include crossing bond wires as described with reference to FIG. 9. Integrator portion 806 calculates Equation (1) in order to determine the amount of crosstalk between bond wires. Integrator portion 806 stores information into memory portion 808 including layout information and cross-over placements stored in cross-over placement portion 815 and associated cross talk information stored into cross talk portion 816. Modifier portion 814 receives placement information and cross talk information from integrator portion 806 and may add or remove bond wire layout scenarios from bond wire pair layout portion 1102. The previous process is repeated for available bond wire layout scenarios with associated information stored in memory portion 808, cross-over placement portion 815 and cross talk portion 816. Following the performance of the cross talk calculation for potential bond wire layout scenarios, optimizer portion 810 determines the scenario with the smallest amount of cross talk and communicates the information to layout designer portion 812. Layout designer portion 812 performs detailed layout of bond wires based upon the selected scenario.

System 800 of FIG. 8 establishes crossover placement of differential pairs to minimize crosstalk associated with a circuit layout, whereas system 1100 of FIG. 11 establishes crossover placement in bond wires to minimize crosstalk associated with a circuit layout. Both aspects may be combined in a single system. This will now be described in greater detail with reference to FIG. 12.

FIG. 12 illustrates an example system 1200 for reducing crosstalk associated with bond wires and with differential pairs, in accordance with an aspect of the present invention.

System 1200 includes a circuit layout portion 1202, selector portion 804, integrator portion 806, memory portion 808, optimizer portion 810, layout designer portion 812 and modifier portion 814.

Selector portion 804 receives information from circuit layout portion 1202 via communication channel 817 and from integrator portion 806 via communication channel 818. Layout designer portion 812 receives information from optimizer portion 810 via communication channel 826 and from circuit layout portion 1202 via communication channel 828. Circuit layout portion 1202 receives information from modifier portion 814 via communication channel 832.

Circuit layout portion 1202 provides information associated with a plurality of potential bond wire pair and differential configurations from which to select. Selector portion 804 selects bond wire and differential pair configurations for application. Integrator portion 806 integrates between bond wires in order to determine the crosstalk between the bond wires. Furthermore, integrator portion 806 integrates between differential pairs in order to determine the crosstalk between the differential pairs. Memory portion 808 receives, retrieves and stores information. Optimizer portion 810 performs optimization associated with reducing bond wire and differential pair cross talk. Layout designer portion 812 performs bond wire and differential pair layouts. Modifier portion 814 modifies bond wire and differential pair layouts. Cross-over placement portion 815 receives, retrieves and stores information associated with bond wire and differential pair cross-over placement. Cross talk portion 816 stores information associated with cross talk.

In operation, circuit layout portion 1202 contains a plurality of potential layout scenarios for bond wires and differential pairs. Selector portion 804 selects a scenario for laying out the bond wires and differential pairs. Scenario may include crossing bond wires as described with reference to FIG. 9 and crossing differential pairs as described with reference to FIG. 6B and FIG. 7B. Integrator portion 806 calculates Equation (1) in order to determine the amount of crosstalk between bond wires. Furthermore, integrator portion 806 calculates of Equation (1) in order to determine the amount of crosstalk between differential pairs. Integrator portion 806 stores information into memory portion 808 including layout information and cross-over placements stored in cross-over placement portion 815 and associated cross talk information stored into cross talk portion 816. Modifier portion 814 receives placement information and cross talk information from integrator portion 806 and may add or remove bond wire and/or differential pair layout scenarios from circuit layout portion 1202. The previous process is repeated for available bond wire and differential a priori layout scenarios with associated information stored in memory portion 808, cross-over placement portion 815 and cross talk portion 816. Following the performance of the cross talk calculation for potential bond wire and differential pair layout scenarios, optimizer portion 810 determines the scenario with the smallest amount of cross talk and communicates the information to layout designer portion 812. Layout designer portion 812 performs detailed layout of bond wires and differential pairs based upon the selected scenario.

Figure 13:
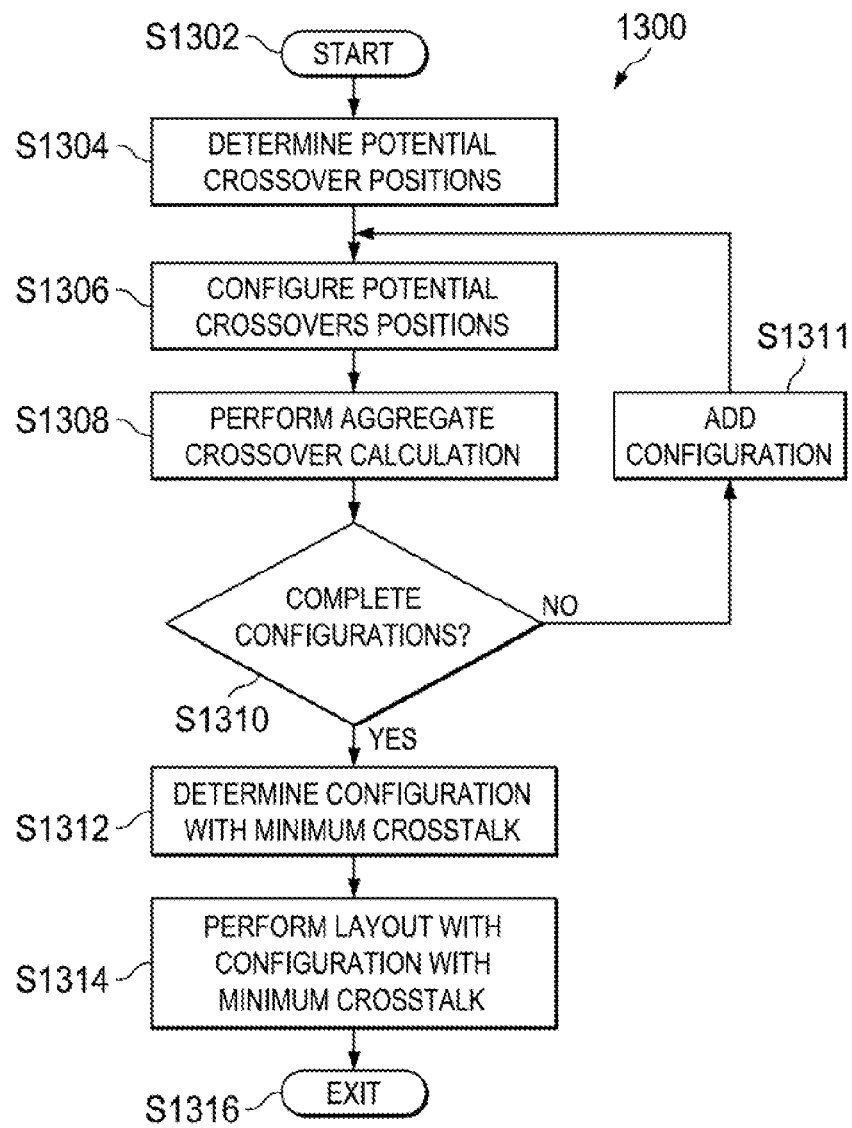
FIG. 13 presents a flow chart illustrating an exemplary method for performing minimization of crosstalk associated with bond wires, in accordance with an exemplary embodiment of the present invention.

FIG. 13 presents a flow chart illustrating an exemplary method 1300 for performing minimization of crosstalk associated with bond wires, in accordance with an exemplary embodiment of the present invention.

As shown in the figure, in an example embodiment, method 1300 starts (S1302) and a determination is performed for potential crossover positions (S1304).

For performing crosstalk minimization for circuit differential pairs as described with reference to FIGS. 6A-7B, differential pair layout portion 802 (FIG. 8) determines a plurality of potential layout scenarios for differential pairs. For performing crosstalk minimization for bond wires as described with reference to FIG. 9, bond wire pair layout portion 1102 (FIG. 11) determines a plurality of potential layout scenarios for bond wires. For performing crosstalk minimization for differential pairs as described with reference to FIGS. 6A-7B and for bond wires as described with reference to FIG. 9, circuit layout portion 1202 (FIG. 12) determines a plurality of potential layout scenarios for bond wires and differential pairs.

For example, with reference to FIG. 7B, potential differential pair crossover points may be located at cross section 754, point 756, point 758, point 760 and point 762. As such, in this example, the number of potential crossover configurations may be calculated as $2^5$. As another example, potential bond wire configurations may be as described with reference to FIG. 9. As another example, with additional reference to FIG. 7B, potential differential pair and bond wire configurations may be the combination of cross section 754, point 756, point 758, point 760 and point 762 as described with reference to FIG. 7B and the bond wire configurations as described with reference to FIG. 9.

Referring back to FIG. 13, then a potential differential pair crossover configuration as described with reference to FIGS. 6A-7B is selected for analysis (S1306).

Selector portion 804 selects a scenario for configuring differential pair crossovers.

For example, for performing crosstalk calculation for differential pairs, a crossover configuration is selected from the set of potential differential pair crossover configurations.

Furthermore, with reference to FIG. 7B, the differential pair configuration of no crossing at points 756, 758, 760, 762 and crossing at cross section 754 may be selected.

As another example, for performing crosstalk calculation for bond wires, a crossover configuration is selected from the set of potential bond wire crossover configurations. Furthermore, the bond wire configuration as described with reference to FIG. 9 may be selected.

As another example, for performing crosstalk calculation for differential pairs and bond wires, a crossover configuration is selected from the set of potential differential pair and bond wire configurations. Furthermore, the differential pair configuration of no crossing at points 756, 758, 760, 762 as described with reference to FIG. 7B and the bond wire configuration as described with reference to FIG. 9 may be selected.

Referring back to FIG. 13, then an aggregate crossover calculation is performed on a system basis (S1308).

For differential pairs as described with reference to FIG. 8, for bond wires as described with reference to FIG. 11 or for differential pairs and bond wires as described with reference to FIG. 12, integrator portion 806 calculates Equation (I) in order to determine the amount of crosstalk between bond wires and/or differential pairs. Furthermore, integrator portion 806 calculates Equation (1) in order to determine the amount of crosstalk between bond wires and/or differential pairs. Integrator portion 806 stores information into memory portion 808 including layout information and cross-over placements stored in cross-over placement portion 815 and associated cross talk information stored into cross talk portion 816.

For example, a crossover calculation may be performed for no crossing at points 756, 758, 760, 762 and crossing at cross section 754 as described with reference to FIG. 7B.

As another example, a crossover calculation may be performed for the bond wire configuration as described with reference to FIG. 9.

As another example, a crossover calculation may be performed for no crossing at points 756, 758, 760, 762 and crossing at cross section 754 as described with reference to FIG. 7B and for the bond wire configuration as described with reference to FIG. 9.

Referring back to FIG. 13, then a determination is performed for completing the analysis for the total set of potential configurations (S1310).

For differential pairs as described with reference to FIG. 8, for bond wires as described with reference to FIG. 11 or for differential pairs and bond wires as described with reference to FIG. 12, system 800, system 1100 or system 1200, respectively, determines if any further configurations are available in cross-over placement portion 815 for performing crossover analysis.

For example, for differential pairs as described with reference to FIG. 8 a determination is performed as to whether all of the differential pair configurations for points 756, 758, 760, 762 and cross section 754 as described with reference to FIG. 7B have been selected for crosstalk analysis.

As another example, for bond wires as described with reference to FIG. 11 a determination is performed as to whether all of the bond wire configurations as described with reference to FIG. 9 have been selected for crosstalk analysis.

As another example, for differential pairs and bond wires as described with reference to FIG. 12 a determination is performed as to whether all of the differential pair configurations for points 756, 758, 760, 762 and cross section 754 as described with reference to FIG. 7B and all of the potential bond wires configurations as described with reference to FIG. 9 have been selected for crosstalk analysis.

Referring back to FIG. 13, for a determination of not completing the analysis for the total set of potential configurations (S1310), then configurations are added to set of configurations as needed (S1311) followed by execution of method 1300 transitioning to configuring another scenario of crossover positions (S1306).

For differential pairs as described with reference to FIG. 8, for bond wires as described with reference to FIG. 11 or for differential pairs and bond wires as described with reference to FIG. 12, system 800, system 1100 or system 1200, respectively, modifier portion 814 receives placement information and cross talk information from integrator portion 806 and may add or remove layout scenarios from differential pair layout portion 802.

For example, for differential pairs a new crossover location may be added to differential pair 701 in section 722 as described with reference to FIG. 7B.

As another example, for bond wires a new bond wire crossover configuration may be added as described with reference to FIG. 9.

For example, for differential pairs and bond wires a new crossover location may be added to differential pair 701 in section 722 as described with reference to FIG. 7B and a new bond wire crossover configuration may be added as described with reference to FIG. 9.

Referring back to FIG. 13, for a determination of completing the analysis for the total set of potential configurations (S1310), then a determination is performed for the configurations with the minimum crosstalk (S1312).

For differential pairs as described with reference to FIG. 8, for bond wires as described with reference to FIG. 11 or for differential pairs and bond wires as described with reference to FIG. 12, system 800, system 1100 or system 1200, respectively, optimizer portion 810 determines the scenario with the smallest amount of cross talk and communicates the information to layout designer portion 812.

For example, for differential pairs with no crossing at points 756, 758, 760, 762 and crossing at cross section 754 as described with reference to FIG. 7B may be determined as the configuration with the minimum crosstalk.

As another example, for bond wires the configuration as described with reference to FIG. 9 may be determined as the configuration with the minimum crosstalk.

As another example, for differential pairs and bond wires with no crossing for differential pairs at points 756, 758, 760, 762 and crossing at cross section 754 as described with reference to FIG. 7B and the bond wire configuration as described with reference to FIG. 9 may be determined as the configuration with the minimum crosstalk.

Referring back to FIG. 13, then a layout of the system is performed based upon the minimum crosstalk configuration (S1314).

Layout designer portion 812 performs detailed layout of circuit based upon the selected scenario.

For example, for the differential pair configuration with no crossing at points 756, 758, 760, 762 and crossing at cross section 754 as described with reference to FIG. 7B may be laid out for the system.

As another example, the bond wire configuration as described with reference to FIG. 9 may be laid out for the system.

As another example, for differential pairs and bond wires configuration with no crossing for differential pairs at points 756, 758, 760, 762 and crossing at cross section 754 as described with reference to FIG. 7B and bond wire configuration as described with reference to FIG. 9 may be laid out for the system.

Referring back to FIG. 13, then execution of method 1300 terminates (S1316).

FIG. 13 presents a flow chart illustrating an exemplary method for performing minimization of crosstalk associated with bond wires where a minimum configuration is determined from a set of configurations, and the system is configured with the minimum configurations.

A bond wire cross over optimization system has been described which performs optimization for reducing cross talk. A bond wire configuration has been described which enables the use of bond wire packaging for high speed electronic devices which could not be used with conventional technology due to space and coupling limitations. Furthermore, the bond wire configuration reduces the coupling between imbalanced differential pairs via a bond wire crossover which results in a near zero coupling between bond wire differential pairs. Furthermore, the bond wire configuration may be easily implemented using standard manufacturing technology. Furthermore, the bond wire configuration yields and inexpensive package for high performance systems. Furthermore, the bond wire configuration may be observed using x-ray. A differential pair cross over optimization system has been described which performs optimization for reducing cross talk. A combined bond wire and differential cross over optimization system has been described which performs optimization for reducing cross talk The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for use with circuit layout design data including at least one of disposition of a set of differential pairs and a set of bond wire pairs, the set of differential pairs including a first differential pair, a second differential pair and a third differential pair, the set of bond wire pairs including a first bond wire pair, a second bond wire pair and a third bond wire pair, said system comprising:
   a layout portion operable to receive the circuit layout design data;
   a memory for storing data relating to a plurality of amounts of crosstalk, the memory further comprising:
      a crosstalk calculating portion operable to determine a first amount of crosstalk in a circuit corresponding to the circuit layout design data;
   a modifier operable to modify the circuit layout design data into modified circuit layout design data such that one of the set of differential pairs and the set of bond wire pairs includes a crossover;
   an optimizer coupled to the memory for generating optimized circuit layout design data by comparing amounts of crosstalk from the plurality of amounts of crosstalk stored in the memory; and
   a layout designer coupled to the optimizer operable to output the optimized circuit layout design data,
   wherein said crosstalk calculating portion is further operable to determine a second amount of crosstalk in a circuit corresponding to the modified circuit layout design data, and
   wherein said optimizer is operable to compare the first amount of crosstalk with the second amount of crosstalk to generate the optimized circuit layout design data.

2. The system of claim 1,
   wherein the circuit layout design data includes disposition of a set of differential pairs,
   wherein said crosstalk calculating portion is operable to determine the first amount of crosstalk in the circuit corresponding to the disposition of the set of differential pairs, and
   wherein said modifier is operable to modify the disposition of the set of differential pairs into modified disposition of the set of differential pairs such that one of the set of differential pairs includes a crossover.

3. The system of claim 2,
   wherein the disposition of a set of differential pairs includes a first predetermined cross-over placement and a second predetermined cross-over placement, and
   wherein said crosstalk calculating portion is operable to determine the first amount of crosstalk in the circuit corresponding to the first predetermined cross-over placement and is operable to determine the second amount of crosstalk in the circuit corresponding to the second predetermined cross-over placement.

4. The system of claim 3,
   wherein the circuit layout design data includes disposition of a set of bond wire pairs, wherein said crosstalk calculating portion is further operable to determine the first amount of crosstalk in the circuit corresponding additionally to the disposition of the set of bond wire pairs, and wherein said modifier is further operable to modify the disposition of the set of differential pairs and bond wire pairs into modified disposition of the set of differential pairs and bond wire pairs such that one of the set of bond wire pairs includes a crossover.

5. The system of claim 2, wherein the circuit layout design data includes disposition of a set of bond wire pairs, wherein said crosstalk calculating portion is further operable to determine the first amount of crosstalk in the circuit corresponding additionally to the disposition of the set of bond wire pairs, and wherein said modifier is further operable to modify the disposition of the set of differential pairs and bond wire pairs into modified disposition of the set of differential pairs and bond wire pairs such that one of the set of bond wire pairs includes a crossover.

6. The system of claim 1, wherein the circuit layout design data includes disposition of a set of bond wire pairs, wherein said crosstalk calculating portion is further operable to determine the first amount of crosstalk in the circuit corresponding additionally to the disposition of the set of bond wire pairs, and wherein said modifier is further operable to modify the disposition of the set of differential pairs and bond wire pairs into modified disposition of the set of differential pairs and bond wire pairs such that one of the set of bond wire pairs includes a crossover.

7. The system of claim 6, wherein the disposition of a set of bond wire pairs includes a first predetermined cross-over placement and a second predetermined cross-over placement, and wherein said crosstalk calculating portion is operable to determine the first amount of crosstalk in the circuit corresponding to the first predetermined cross-over placement and is operable to determine the second amount of crosstalk in the circuit corresponding to the second predetermined cross-over placement.

8. A method of using circuit layout design data including at least one of disposition of a set of differential pairs and a set of bond wire pairs, the set of differential pairs including a first differential pair, a second differential pair and a third differential pair, the set of bond wire pairs including a first bond wire pair, a second bond wire pair and a third bond wire pair, said method comprising:

receiving, via a layout portion, the circuit layout design data;

determining, via a crosstalk calculating portion, a first amount of crosstalk in a circuit corresponding to the circuit layout design data;

modifying, via a modifier, the circuit layout design data into modified circuit layout design data such that one of the set of differential pairs and the set of bond wire pairs includes a crossover;

determining, via the crosstalk calculating portion, a second amount of crosstalk in a circuit corresponding to the modified circuit layout design data comparing, via an optimizer, the first amount of crosstalk with the second amount of crosstalk;

generating, via the optimizer, optimized circuit layout design data; and outputting, via a layout designer, the optimized circuit layout design data, wherein a hardware memory having a cross-over placement portion and the crosstalk calculating portion stores the first amount of crosstalk and the second amount of crosstalk and communicates bi-directionally with the optimizer via a communication channel.

9. The method of claim 8, wherein said receiving, via a layout portion, the circuit layout design data comprises receiving the circuit layout design data to include the disposition of a set of differential pairs, wherein said determining, via a crosstalk calculating portion, a first amount of crosstalk in a circuit corresponding to the circuit layout design data comprises determining the first amount of crosstalk in the circuit corresponding to the disposition of the set of differential pairs, and wherein said modifying, via a modifier, the circuit layout design data into modified circuit layout design data such that one of the set of differential pairs and the set of bond wire pairs includes a crossover comprises modifying the disposition of the set of differential pairs into modified disposition of the set of differential pairs such that one of the set of differential pairs includes a crossover.

10. The method of claim 9, wherein said receiving the circuit layout design data to include the disposition of a set of differential pairs comprises receiving the circuit layout design data to include the disposition of a set of differential pairs to includes a first predetermined cross-over placement and a second predetermined cross-over placement, wherein said determining, via a crosstalk calculating portion, a first amount of crosstalk in a circuit corresponding to the circuit layout design data comprises determining the first amount of crosstalk in the circuit corresponding to the first predetermined cross-over placement, and wherein said determining, via the crosstalk calculating portion, a second amount of crosstalk in a circuit corresponding to the modified circuit layout design data comprises determining the second amount of crosstalk in the circuit corresponding to the second predetermined cross-over placement.

11. The method of claim 10, wherein said receiving the circuit layout design data to include the disposition of a set of differential pairs comprises receiving the circuit layout design data to additionally include the disposition of a set of bond wire pairs, wherein said determining the first amount of crosstalk in the circuit corresponding to the disposition of the set of differential pairs comprises determining the first amount of crosstalk in the circuit corresponding additionally to the disposition of the set of bond wire pairs, and wherein said modifying the disposition of the set of differential pairs into modified disposition of the set of differential pairs such that one of the set of differential pairs includes a crossover comprises modifying the disposition of the set of differential pairs and bond wire pairs into modified disposition of the set of differential pairs and bond wire pairs such that one of the set of bond wire pairs includes a crossover.

12. The method of claim 9,
wherein said receiving, via a layout portion, the circuit layout design data comprises receiving the circuit layout design data to include the disposition of a set of bond wire pairs,
wherein said determining, via a crosstalk calculating portion, a first amount of crosstalk in a circuit corresponding to the circuit layout design data comprises determining the first amount of crosstalk in the circuit corresponding to the disposition of the set of bond wire pairs, and
wherein said modifying, via a modifier, the circuit layout design data into modified circuit layout design data such that one of the set of bond-wire pairs and the set of bond wire pairs includes a crossover comprises modifying the disposition of the set of bond wire pairs into modified disposition of the set of bond-wire pairs such that one of the set of bond wire pairs includes a crossover.

13. The method of claim 8,
wherein said receiving, via a layout portion, the circuit layout design data comprises receiving the circuit layout design data to include the disposition of a set of bond wire pairs,
wherein said determining, via a crosstalk calculating portion, a first amount of crosstalk in a circuit corresponding to the circuit layout design data comprises determining the first amount of crosstalk in the circuit corresponding to the disposition of the set of bond wire pairs, and
wherein said modifying, via a modifier, the circuit layout design data into modified circuit layout design data such that one of the set of bond-wire pairs and the set of bond wire pairs includes a crossover comprises modifying the disposition of the set of bond wire pairs into modified disposition of the set of bond-wire pairs such that one of the set of bond wire pairs includes a crossover.

14. The method of claim 13,
wherein the disposition of a set of bond wire pairs includes a first predetermined cross-over placement and a second predetermined cross-over placement, and
wherein said crosstalk calculating portion is operable to determine the first amount of crosstalk in the circuit corresponding to the first predetermined cross-over placement and is operable to determine the second amount of crosstalk in the circuit corresponding to the second predetermined cross-over placement.

* * * * *